United States Patent [19]

Sato et al.

[11] Patent Number: 5,447,655
[45] Date of Patent: Sep. 5, 1995

[54] POLYMERIC LIQUID CRYSTAL COPOLYMER COMPOUND, COMPOSITION, THEREROF, AND POLYMERIC LIQUID CRYSTAL DEVICE MAKING USE OF THESE

[75] Inventors: Koichi Sato, Sagamihara; Kazuo Yoshinaga, Machida; Yomishi Toshida, Yokohama; Takeo Eguchi, Atsugi, all of Japan

[73] Assignee: Cannon Kabushiki Kaisha, Tokyo, Japan

[21] Appl. No.: 722,204

[22] Filed: Jun. 27, 1991

[30] Foreign Application Priority Data

Jun. 29, 1990 [JP] Japan .................. 2-169753
Jun. 30, 1990 [JP] Japan .................. 2-171355

[51] Int. Cl.6 .................................. C09K 19/52
[52] U.S. Cl. .................. 252/299.01; 528/32; 528/425; 428/1; 526/242; 526/245; 526/279; 526/291; 526/292.1; 526/292.3; 526/333
[58] Field of Search ........ 252/299.01, 299.06; 359/75, 76, 100, 102, 104, 106; 528/32, 425; 526/242, 245, 279, 291, 292.1, 292.3, 333; 428/1

[56] References Cited

U.S. PATENT DOCUMENTS

| | | | |
|---|---|---|---|
| 3,859,321 | 1/1975 | Traver | 252/78 |
| 4,367,924 | 1/1983 | Clark et al. | 350/334 |
| 4,743,106 | 5/1988 | Novicky | 351/160 R |
| 4,820,026 | 4/1989 | Okada et al. | 350/341 |
| 4,873,018 | 10/1989 | Nohira et al. | 252/229.01 |
| 4,913,839 | 4/1990 | Uchida et al. | 252/299.01 |
| 4,943,617 | 7/1990 | Etzbach et al. | 525/329.9 |
| 4,950,726 | 8/1990 | Yoshioka et al. | 528/25 |
| 4,981,607 | 1/1991 | Okawa et al. | 252/299.01 |
| 5,034,153 | 6/1991 | Uchida et al. | 252/299.01 |
| 5,039,208 | 8/1991 | Ohnishi et al. | 359/100 |
| 5,054,888 | 10/1991 | Jacobs et al. | 252/299.01 |
| 5,138,010 | 8/1992 | Keller et al. | 252/299.01 |
| 5,200,238 | 4/1993 | McArdle et al. | 428/1 |
| 5,252,251 | 10/1993 | Sato et al. | 252/299.01 |

FOREIGN PATENT DOCUMENTS

| | | |
|---|---|---|
| 0242080 | 10/1987 | European Pat. Off. . |
| 0260687 | 3/1988 | European Pat. Off. . |
| 2609993 | 7/1988 | France . |
| 2638164 | 4/1990 | France . |
| 56-107216 | 8/1981 | Japan . |
| 63-072784 | 4/1988 | Japan . |
| 63-099204 | 4/1988 | Japan . |
| 63-161055 | 7/1988 | Japan . |
| WO90/03406 | 4/1990 | WIPO . |

OTHER PUBLICATIONS

W. Helfrich, "Voltage Dependent Optical Activity of a Twisted Nematic Liquid Crystal", 18, *Applied Physics Letters*, No. 4, 127–128 (Feb. 15, 1971).

Shibaev, et al., "Thermotropic Liquid-crystalline polymers: 1411", 24, *Polymer Communications*, 364–365, (Dec., 1983).

*Primary Examiner*—Philip Tucker
*Attorney, Agent, or Firm*—Fitzpatrick, Cella, Harper & Scinto

[57] ABSTRACT

Provided is a polymeric liquid crystal copolymer compound having a repeating unit represented by the formula

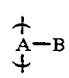

(Ia)

wherein A represents a polymeric main chain of a carbon type; and B represents a polyoxyalkylene group or

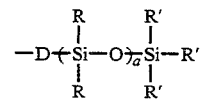

wherein D represents

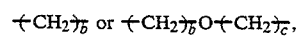

b and c each representing an integer of 0 to 20; R represents an alkyl group, a phenyl group, a siloxy group or a polysiloxy group; R' represents an alkyl group or a phenyl group; and a represents an integer of 0 to 50.

15 Claims, 4 Drawing Sheets

FIG. I

POLYMERIC LIQUID CRYSTAL COPOLYMER COMPOUND, COMPOSITION, THEREROF, AND POLYMERIC LIQUID CRYSTAL DEVICE MAKING USE OF THESE

BACKGROUND OF THE INVENTION

1. Field of the Invention

The present invention relates to a novel polymeric liquid crystal copolymer compound having a siloxane or oxyalkylene unit in its side chain, a polymeric liquid crystal composition containing such a polymeric liquid crystal copolymer compound, and a liquid crystal device making use of any of these polymeric liquid crystal copolymer compound and polymeric liquid crystal composition.

The present invention also relates to novel polymeric liquid crystal copolymer compound having a siloxane in its main chain, a polymeric liquid crystal composition containing such a polymeric liquid crystal copolymer compound, and a liquid crystal device making use of any of these polymeric liquid crystal copolymer compound and polymeric liquid crystal composition.

The polymeric liquid crystal copolymer compound and the polymeric liquid crystal composition containing the polymeric liquid crystal copolymer compound, according to the present invention, can be used as materials for optoelectronic devices, optical devices and so forth as typified by optical display devices and optical memories.

2. Related Background Art

Liquid crystal devices hitherto available are known to include those making use of a twisted nematic liquid crystal as disclosed in M. Schadt and W. Helfrich, "Voltage Dependent Optical Activity of a Twisted Nematic Liquid Crystal", Applied Physics Letters, Vol. 18, No. 4, published Feb. 15, 1971, pp. 127–128. This twisted nematic crystal, however, has the problem that crosstalk may occur in the timesharing drive that makes use of a matrix electrode structure having an increased picture element density, and hence there has been a limitation on the number of picture elements.

There is also a limitation on its use as a display device because of its slow response and poor visual-field angle characteristics. There are also the problems that it requires a very complicated process to form a thin-film transistor in each picture element and also is accompanied with a difficulty in fabricating a display device having a large area.

As an improvement that can eliminate the disadvantages of liquid crystal devices of such a conventional type, Clark and Lagerwall have proposed to use a liquid crystal device capable of assuming either one of two stable states (i.e. bistability), see Japanese Patent Application Laid-open No. 56-107216 or U.S. Pat. No. 4,367,924.

As a liquid crystal having such a bistability, it is common to use a ferroelectric liquid crystal comprised of a chiral smectic C phase (Sm*C) or H phase (Sm*H). This ferroelectric liquid crystal has spontaneous polarization and hence has a very high response speed and also can achieve the two stable states with memory performance. In addition, it has superior visual-field angle characteristics and hence can be considered suitable as a material for large-area display. In actual fabrication of a liquid crystal cell, however, it is difficult to achieve a single domain over a wide area, and there has been a technical problem in the fabrication of a large-screen display device.

It is also known to use a polymeric liquid crystal as a memory medium.

For example, it includes a thermal write memory disclosed in V. Shibaev, S. Kostromin, N. Plate, S. Iranov, V. Vestrov and I. Yakovlev, "Thermotropic Liquid Crystalline Polymers. 14", Polymer Communications, Vol. 24, pp.364–365.

However, the method disclosed in this publication, which utilizes light scattering in reading, can achieve only a poor contrast and also has the problem that the response speed is lowered as the material has a higher molecule. Hence, this method has not put into practical use.

Japanese Patent Applications Laid-open No. 63-72784, No. 63-99204, No. 63-161005, etc. disclose polymeric liquid crystals having ferroelectric properties.

These polymeric liquid crystals, however, even though they are nematic liquid crystals, or chiral smectic liquid crystals having ferroelectric properties, have so high a viscosity than low-molecular liquid crystals that they have greatly poorer response performance. Now, it is attempted to use a blend of the above polymeric liquid crystal and a low-molecular compound or low-molecular liquid crystal that serves as a viscosity reducing agent. Even with use of such a blended polymeric liquid crystal composition, large-area display may become difficult because of poor film properties required as a polymer or phase separation may occur because of lack of compatibility. Hence, it has been impossible to manufacture good polymeric liquid crystal devices.

SUMMARY OF THE INVENTION

The present invention was made in order to overcome such disadvantages involved in the prior art. Objects of the present invention are to provide as a material for optoelectronic devices, optical devices and so forth a novel polymeric liquid crystal copolymer compound that can achieve large-area display, has a low viscosity and has good response characteristics, to provide a polymeric liquid crystal composition containing such a polymeric liquid crystal copolymer compound, and to provide a polymeric liquid crystal device making use of them.

The present invention provides as a first embodiment thereof a polymeric liquid crystal copolymer compound having a repeating unit represented by the following formula (Ia).

wherein A represents a polymeric main chain of a carbon type; and B represents a polyoxyalkylene group or

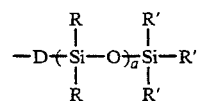

wherein n represents

b and c each representing an integer of 0 to 20; R represents an alkyl group, a phenyl group, a siloxy group or a polysiloxy group; R' represents an alkyl group or a phenyl group; and a represents an integer of 0 to 50.

As a second embodiment, the present invention provides a polymeric liquid crystal copolymer compound having a repeating unit represented by the following formula (Ib).

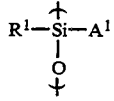

wherein $R^1$ represents an alkyl group or a phenyl group; and $A^1$ represents a substituted or unsubstituted alkyl group having 3 or more carbon atoms, a polyoxyalkylene group, an aryl group or

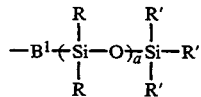

wherein $B^1$ represents

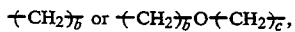

b and c each representing an integer of 0 to 20; R represents an alkyl group, a phenyl group, a siloxy group or a polysiloxy group; R' represents an alkyl group or a phenyl group; and a represents an integer of 0 to 50.

The present invention also provide a polymeric liquid crystal composition comprising the polymeric liquid crystal copolymer compound and at least one of other polymeric compound, polymeric liquid crystal, low-molecular compound and low-molecular liquid crystal.

The present invention provides further a polymeric liquid crystal device comprising the polymeric liquid crystal copolymer compound.

DESCRIPTION OF THE PREFERRED EMBODIMENTS

Figure 1:
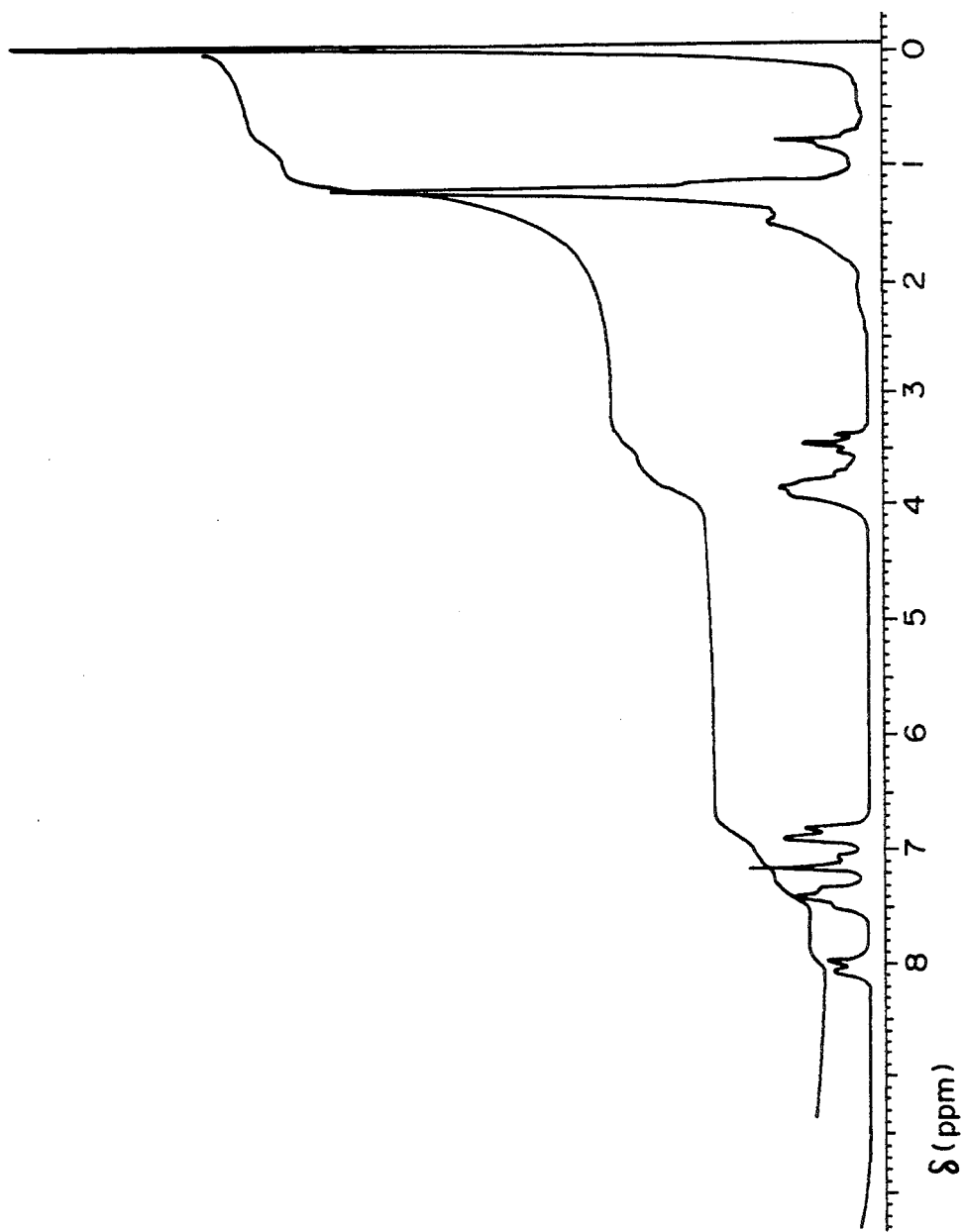
FIGS. 1 to 4 show results of 1H-NMR (in CDCL₃) of polymers (2a), (3a), (9a) and (10a) obtained in Examples.

Taking account of the prior art previously discussed, the present inventors have made intensive studies to discover that a polymeric liquid crystal copolymer compound having a siloxane or oxyalkylene unit in its side chain and a polymeric liquid crystal composition containing such a compound can readily achieve large-area display of liquid crystal devices, making the most of a feature of polymer, and also, because of its low viscosity, can actually provide a polymeric liquid crystal device having very good response characteristics. They have thus accomplished the present invention.

They have also discovered that a polymeric liquid crystal copolymer compound, the siloxane main chain of which has an alkyl group, an aryl group, a polyoxyalkylene group, a silane group or a siloxy group in its side chain, and a polymeric liquid crystal composition containing such a compound can also readily achieve large-area display of liquid crystal devices, making the most of a feature of polymer, and also, because of its low viscosity, can actually provide a polymeric liquid crystal device having very good response characteristics.

More specifically, a first embodiment of the present invention is characterized by a polymeric liquid crystal copolymer compound having a repeating unit represented by the following formula (Ia).

Formula (Ia)

wherein A represents a polymeric main chain of a carbon type; and B represents a polyoxyalkylene group

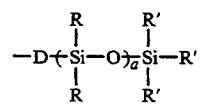

wherein D represents

b and c each representing an integer of 0 to 20; R represents an alkyl group, a phenyl group, a siloxy group or a polysiloxy group; R' represents an alkyl group or a phenyl group; and a represents an integer of 0 to 50.

The present invention is also characterized by a polymeric liquid crystal composition containing at least one polymeric liquid crystal copolymer compound having the repeating unit represented by the above formula (Ia), and at least one compound of other polymeric compound, polymeric liquid crystal, low-molecular compound and low-molecular liquid crystal; and a liquid crystal device comprising the polymeric liquid crystal copolymer compound having the repeating unit represented by the above formula (Ia), or the polymeric liquid crystal composition containing at least one polymeric liquid crystal copolymer compound having said repeating unit and at least one compound of other polymeric compound, polymeric liquid crystal, low-molecular compound and low-molecular liquid crystal.

A second embodiment of the present invention is characterized by a polymeric liquid crystal copolymer compound having a repeating unit represented by the following formula (Ib).

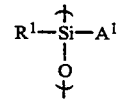

Formula (Ib)

wherein $R^1$ represents an alkyl group or a phenyl group; and $A^1$ represents a substituted or unsubstituted alkyl group having 3 or more carbon atoms, a polyoxyalkylene group, an aryl group or

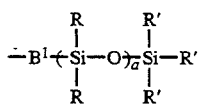

wherein $B^1$ represents

b and c each representing an integer of 0 to 20; R represents an alkyl group, a phenyl group, a siloxy group or a polysiloxy group; R' represents an alkyl group or a phenyl group; and a represents an integer of 0 to 50.

The second embodiment of the present invention is also characterized by a polymeric liquid crystal composition containing at least one polymeric liquid crystal copolymer compound having the repeating unit represented by the above formula (Ib), and at least one compound of other polymeric compound, polymeric liquid crystal, low-molecular compound and low-molecular liquid crystal; and a liquid crystal device comprising the polymeric liquid crystal copolymer compound having the repeating unit represented by the above formula (Ib), or the polymeric liquid crystal composition containing at least one polymeric liquid crystal copolymer compound having said repeating unit and at least one compound of other polymeric compound, polymeric liquid crystal, low-molecular compound and low-molecular liquid crystal.

In the formula (Ia), A represents a polymeric main chain of a carbon type, which includes, for example, the following:

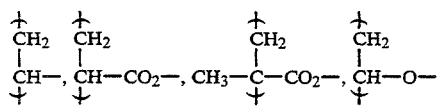

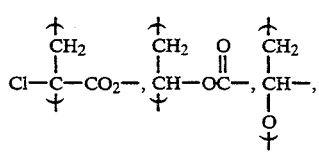

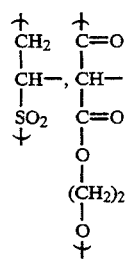

When B is a polyoxyalkylene group, the polyoxyalkylene group is represented by the formula:

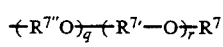

wherein $R^{7''}$ and $R^{7'}$ each represent a straight-chain or branched alkylene group having 1 to 10 carbon atoms; $R^7$ represents an alkylene group having 1 to 10 carbon atoms; and q and r are each an integer of 0 to 10, provided that both are not 0 at the same time.

Specific structures of the repeating unit represented by the formula (Ia) may include the following:

(In the structure No. 8, "Ph" represents a phenyl group.)

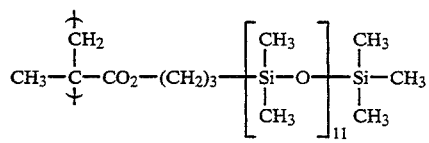

1

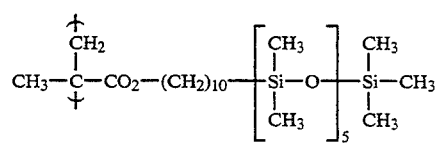

2

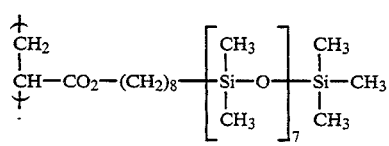

3

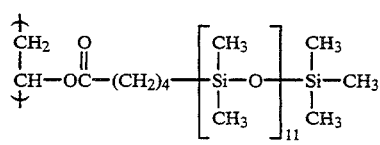

4

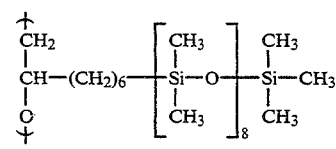

5

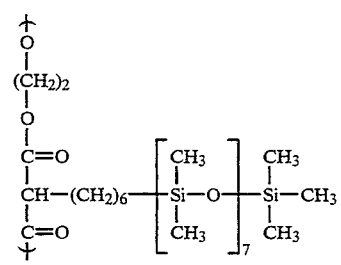

6

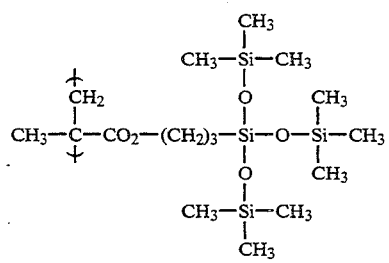

7

-continued

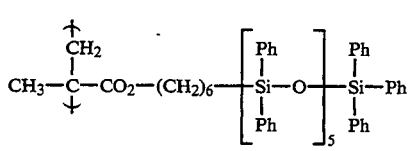

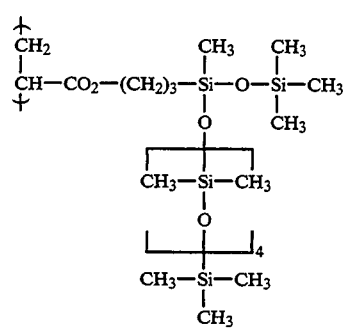

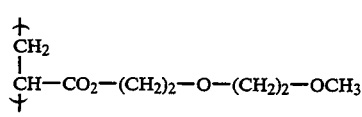

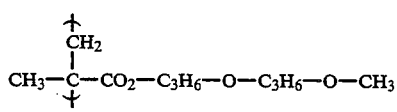

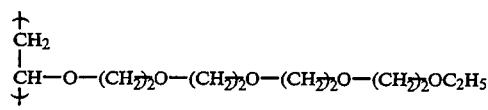

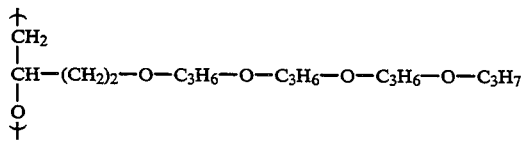

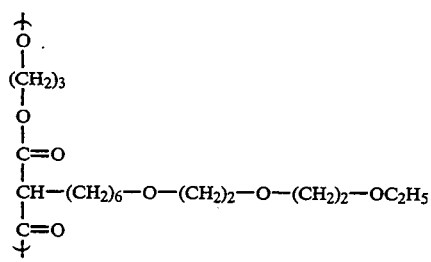

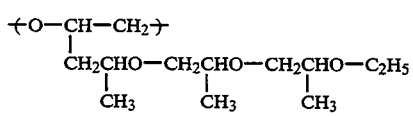

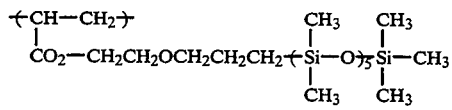

-continued

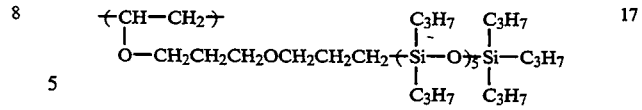

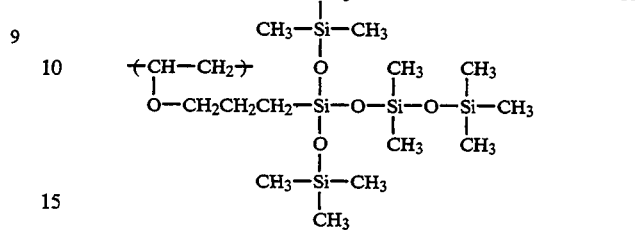

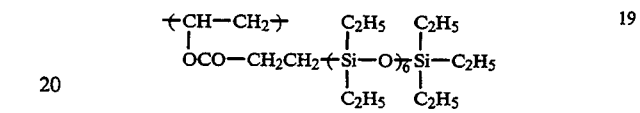

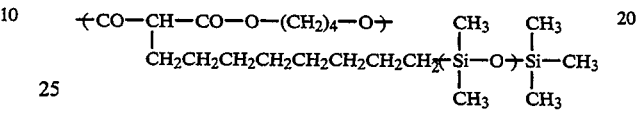

In the polymeric liquid crystal copolymer compound according to the first embodiment of the present invention, a copolymerizing repeating unit other than the repeating unit represented by the formula (Ia) may preferably have a structure wherein a mesogen is bonded to the polymeric main chain through a spacer, i.e., a structure having what is called a crystal-forming ability.

The polymeric liquid crystal copolymer compound of the present invention may preferably have an optically active group and also have ferroelectric properties.

The polymeric liquid crystal copolymer compound of the present invention may have any crystal phase such as a nematic phase, a cholesteric phase, a smectic phase or a chiral smectic phase. When it is a nematic liquid crystal, it can be applied in TN liquid crystal. When it is a cholesteric liquid crystal, it can be applied in the formation of a thin film having a selective reflection wavelength. When it is a chiral smectic liquid crystal, it can be applied as a bistable ferroelectric liquid crystal to give a liquid crystal device having an excellent response. In any instances, it is possible to readily obtain a large-area liquid crystal device. In particular, when it is ferroelectric, it can achieve a response on the order of millisecond or less, which is impossible in nematic liquid crystals, etc., and hence the liquid crystal device can have a superior performance.

The copolymerizing repeating unit other than the repeating unit represented by the formula (Ia) in the polymeric liquid crystal copolymer compound according to the first embodiment of the present invention may have a structure represented by the following formula A.

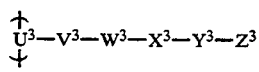

[A]

wherein $U^3$ represents a polymeric main chain, $V^3$ represents

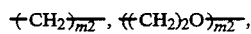

or a structure wherein at least one of hydrogen atoms of

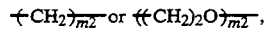

may be substituted with an alkyl group, a halogen atom, a cyano group, an amino group or a carbonyl group, wherein m2 represents an integer of 0 to 30; $W^3$ represents a single bond, —O—, —OCO—, —COO—, —CONR$^8$, —CO— or —NR$^8$, wherein R$^8$ represents a hydrogen atom or an alkyl group; $X^3$ represents a mesogen, which represents a structure wherein at least two rings selected from substituted or unsubstituted homoaromatic rings, heterocyclic rings and alicyclic rings are linked with a single bond, —O—, —OCO—, —COO—,

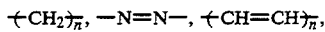

—CH=N—, —N=CH—,

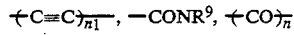

or —NR$^9$, wherein R$^9$ represents a hydrogen atom or an alkyl group and n represents an integer of 1 to 10, or may be a structure wherein at least two of said rings combine to form a condensed ring; $Y^3$ represents a single bond, —O— or —COO—; $Z^3$ represents a substituted or unsubstituted alkyl group, a hydrogen atom, —CN, or a halogen atom. The polymeric main chain represented by $U^3$ may include, for example, the following:

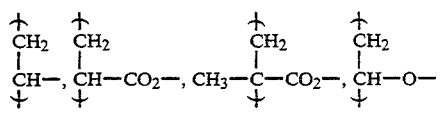

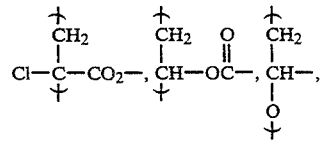

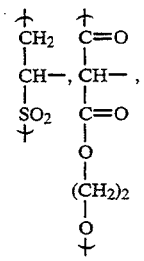

Stated specifically, the above unit can be exemplified by the following:

First, a structure capable of readily rendering a nematic liquid crystal includes, for example, the following:

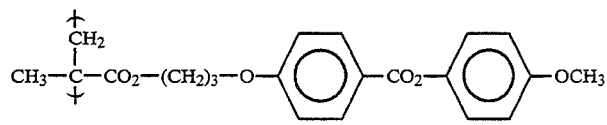

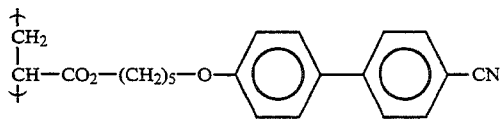

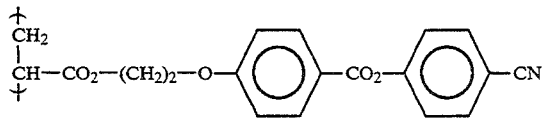

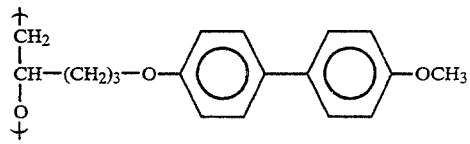

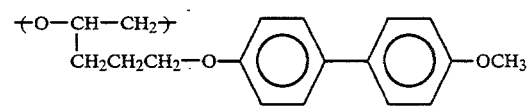

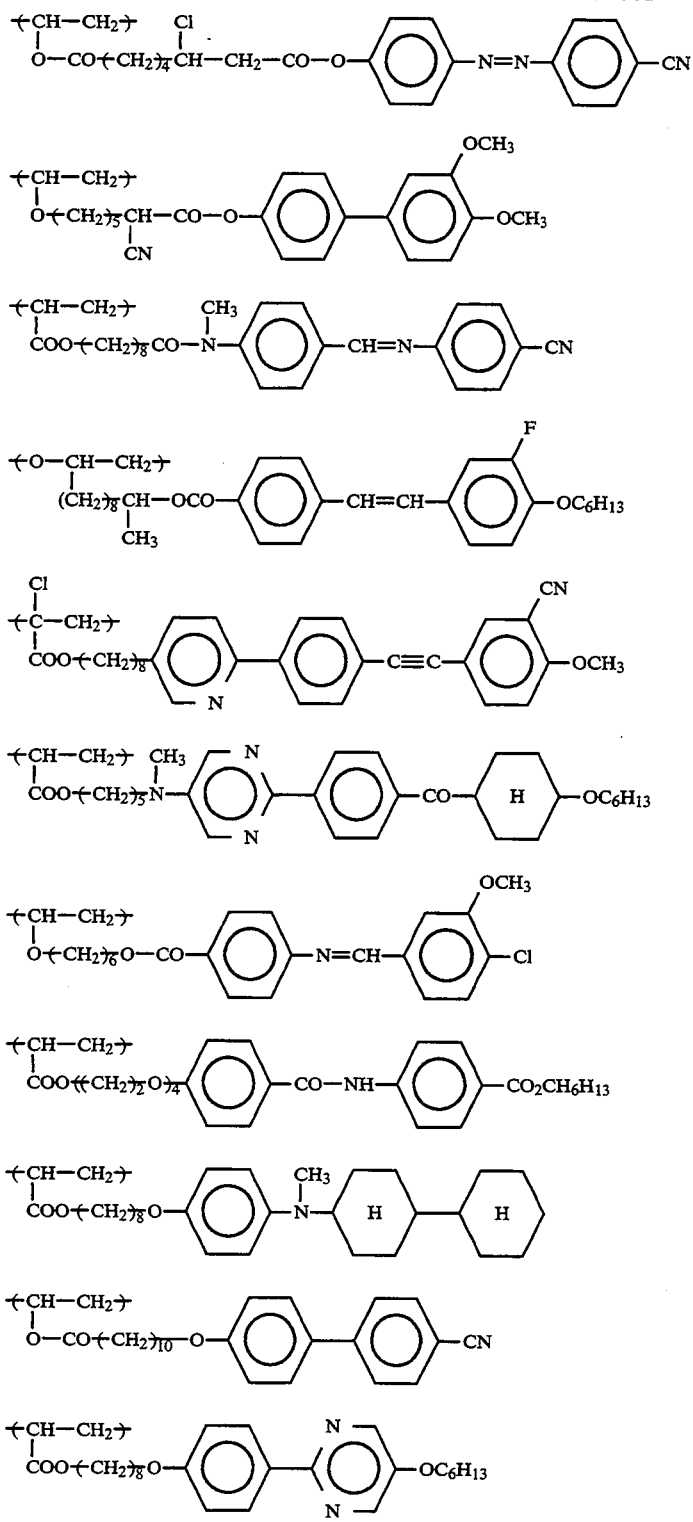
A structure capable of readily rendering a cholesteric liquid crystal includes, for example, the following:
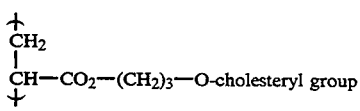

-continued

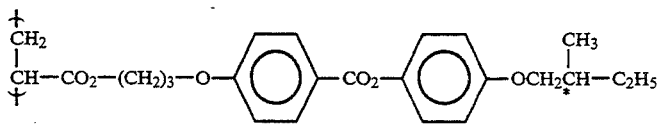

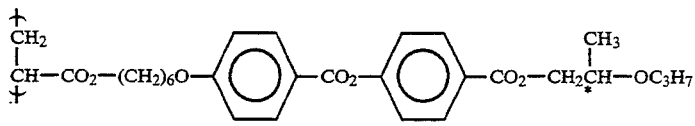

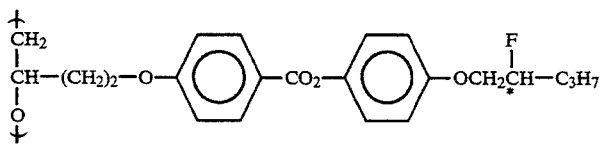

The asterisk * represents an asymmetric carbon atom.

A structure capable of readily rendering a chiral smecticic liquid crystal includes, for example, the following:

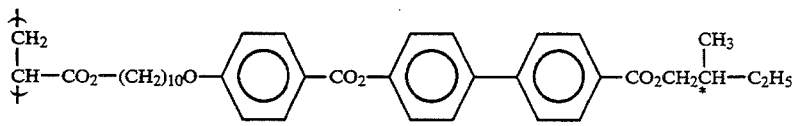

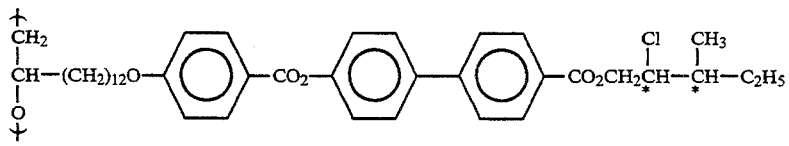

In particular, in view of the advantages that a superior response can be achieved because of a large spontaneous polarization and also a chiral smectic phase can be exhibited over a wide temperature range, the repeating unit other than the repeating unit represented by the formula (Ia) may preferably be a repeating unit represented by the following formula (IIa) or (IIIa).
Formula (IIa)

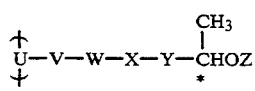

wherein U represents a polymeric main chain, V represents

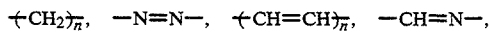

or a structure wherein at least one of hydrogen atoms of

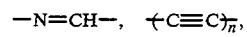

may be substituted with an alkyl group, a halogen atom, a cyano group, an amino group or a carbonyl group, wherein m represents an integer of 0 to 30; W represents a single bond, —O—, —OCO—, —COO—, —CONR$^3$, —CO— or —NR$^3$, wherein R$^3$ represents a hydrogen atom or an alkyl group; X represents a mesogen, which represents a structure wherein at least two rings selected from substituted or unsubstituted homo-aromatic rings, heterocyclic rings and alicyclic rings are linked with a single bond, —O—, —OCO—, —COO—,

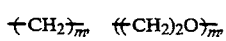

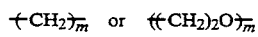

—CONR$^3$, —(CO)$_n$— or —NR$^3$, wherein R$^3$ represents a hydrogen atom or an alkyl group and n represents an integer of 1 to 10, or may be a structure wherein at least two of said rings combine to form a condensed ring; Y represents —COOCH$_2$—, —O—CH$_2$— or —OCO—; the asterisk * represents an asymmetric carbon atom; and Z represents —R$^2$ or —COR$^2$, wherein R$^2$ represents a hydrogen atom or a substituted or unsubstituted alkyl group. The polymeric main chain represented by U can be exemplified by those for the examples of U$^3$ previously described.

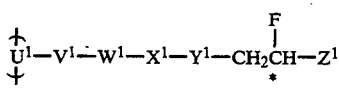

wherein $U^1$ represents a polymeric main chain, $V^1$ represents

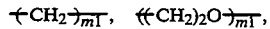

or a structure wherein at least one of hydrogen atoms of

may be substituted with an alkyl group, a halogen atom, a cyano group, an amino group or a carbonyl group, wherein m1 represents an integer of 0 to 30; $W^1$ represents a single bond, —O—, —OCO—, —COO—, —CONR$^{3'}$, —CO— or —NR$^{3'}$, wherein R$^{3'}$ represents a hydrogen atom or an alkyl group; $X^1$ represents a mesogen, which represents a structure wherein at least two rings selected from substituted or unsubstituted homo-aromatic rings, heterocyclic rings and alicyclic rings are linked with a single bond, —O—, —OCO—, —COO—,

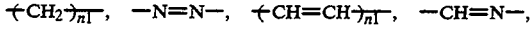

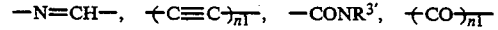

or —NR$^{3'}$, wherein R$^{3'}$ represents a hydrogen atom or an alkyl group and n1 represents an integer of 1 to 10; $Y^1$ represents a single bond, —O— or —CO—; $Z^1$ represents a substituted or unsubstituted alkyl group; and the asterisk * represents an asymmetric carbon atom. The polymeric main chain represented by $U^1$ can be exemplified by those for the examples of $U^3$ previously described.

Specific structures of the repeating unit represented by the formula (IIa) can be exemplified by the following:

(In the following, $R^4$ represents hydrogen an alkyl group or a halogen atom, and m represents an integer of 0 to 30).

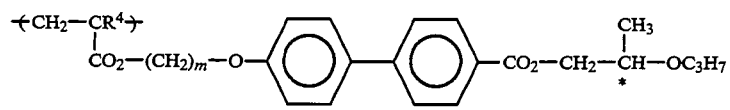

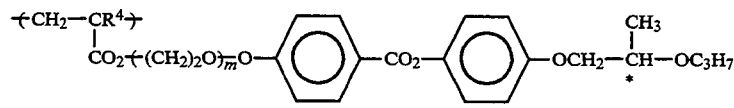

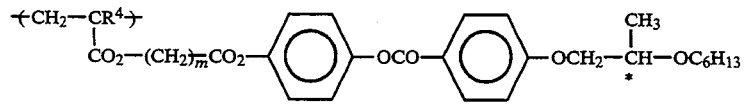

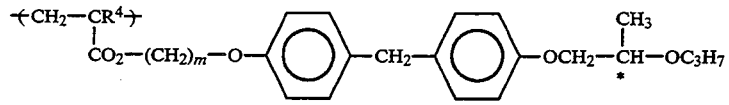

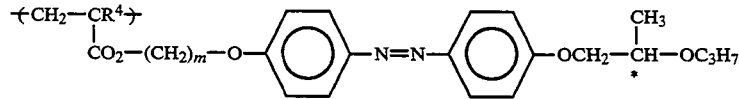

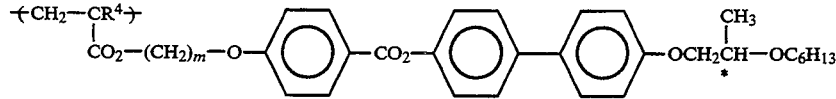

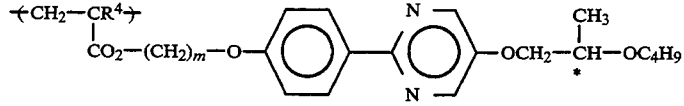

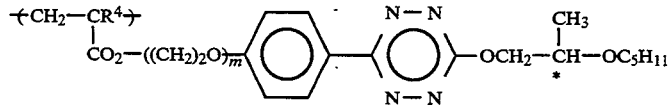

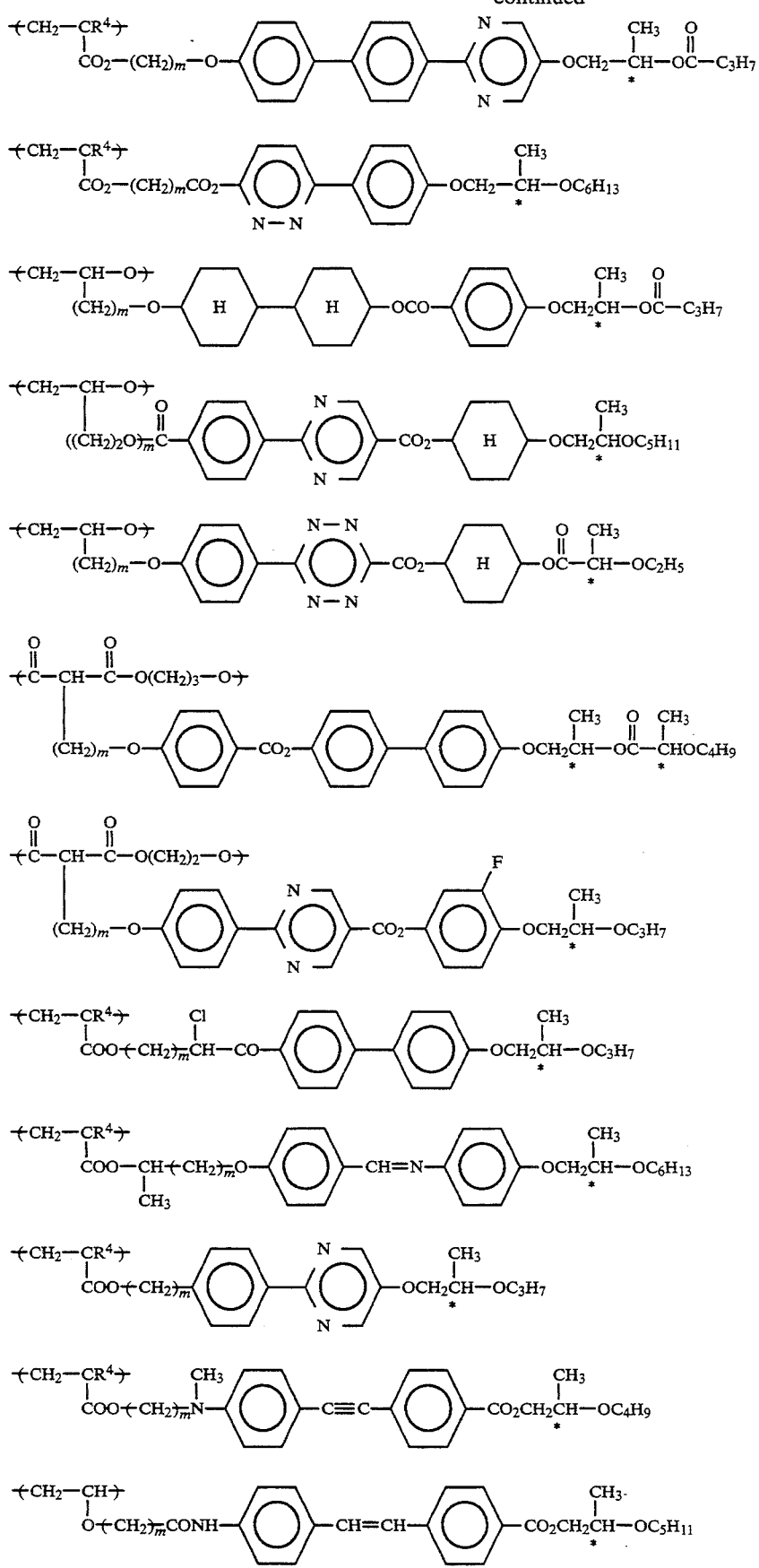

Specific structures of the repeating unit represented by the formula (IIIa) can be exemplified by the following:
(In the following, $R^5$ represents hydrogen an alkyl group or a halogen atom, and m1 represents an integer of 0 to 30).
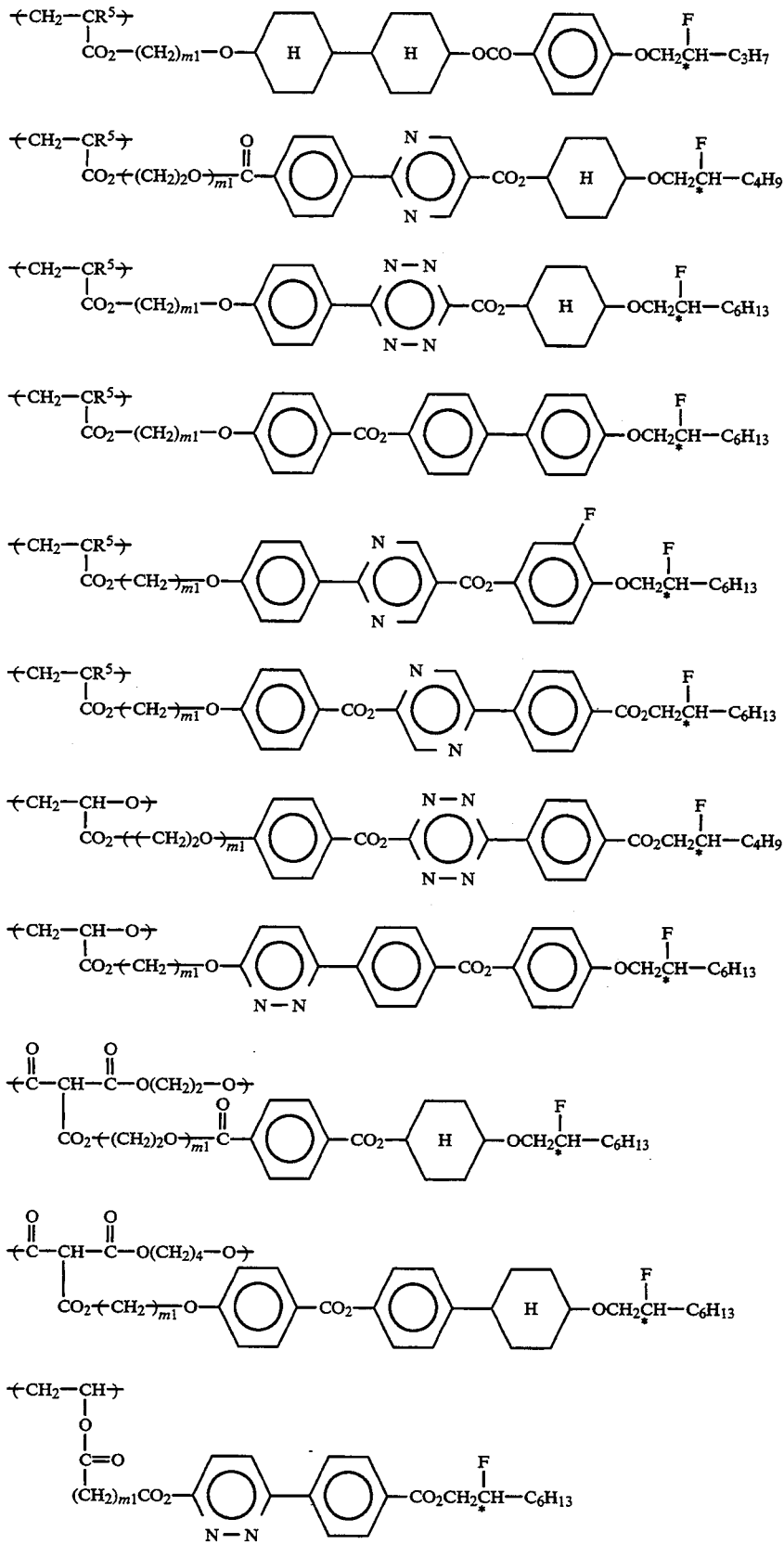

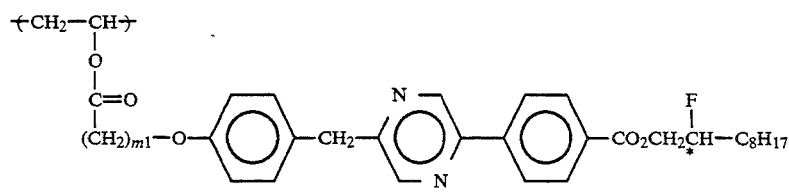
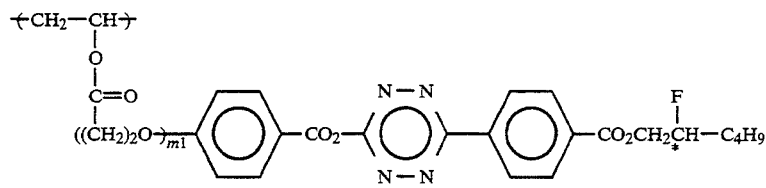
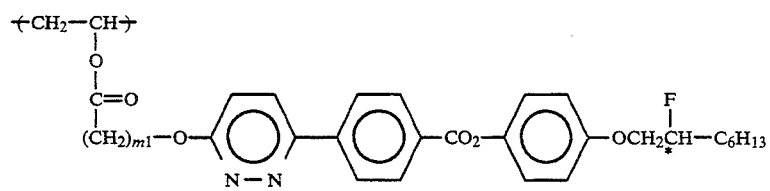
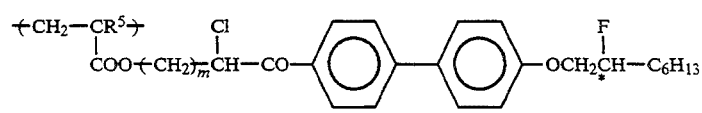
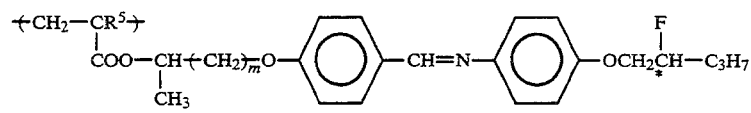
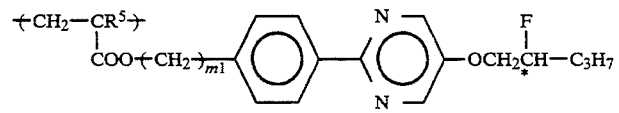
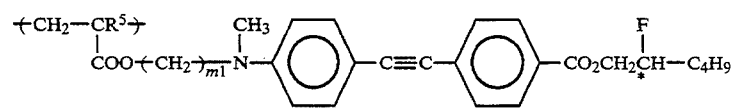
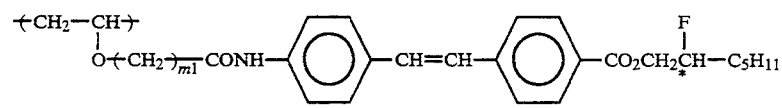
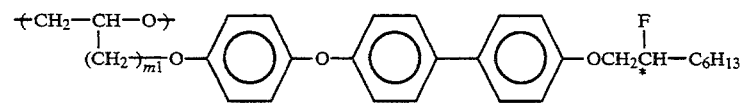
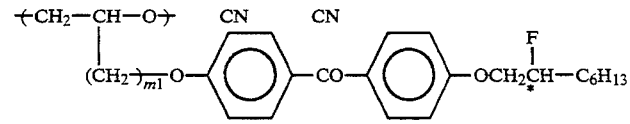
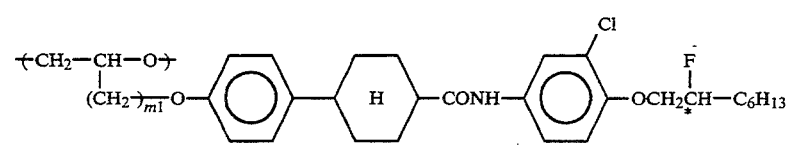

-continued

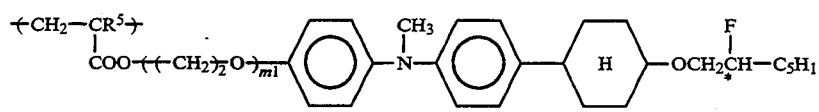

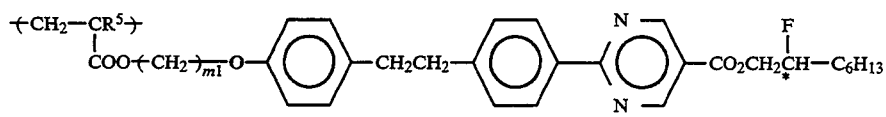

The polymeric liquid crystal copolymer compound according to the first embodiment of the present invention is comprised of at least one kind of the repeating unit represented by the formula (Ia) and the repeating unit other than the repeating unit represented by the formula (Ia), as exemplified in the above. Since this polymeric liquid crystal copolymer compound has the repeating unit represented by the formula (Ia), containing a siloxane or oxyalkylene unit, which has a viscosity reducing action, it has a remarkably lower viscosity than that of any conventional polymeric liquid crystal compounds, and has a very good response to an external field.

In the polymeric liquid crystal copolymer compound of the present invention, the viscosity reducing component, the siloxane or oxyalkylene unit, is introduced as a polymerizing component through a chemical bond, and hence the compound is also superior in that it is a homogeneous and uniform compound. On the other hand, in instances in which a compound having a siloxane or an oxyalkylene unit and a polymeric liquid crystal are merely blended, there is no compatibility between them in almost all instances to cause phase separation. On the contrary, in the polymeric liquid crystal copolymer compound of the present invention is free from such a disadvantage, presenting a contrast with such instances.

The repeating unit represented by the formula (Ia) in the polymeric liquid crystal copolymer compound of the present invention should preferably be contained in an amount ranging from 1 mol % to 95 mol %, and more preferably from 5 mol % to 90 mol %. An amount less than 1 mol % may bring about no remarkable viscosity reducing action, and an amount more than 95 mol % may result in no formation of a liquid crystal.

The polymeric liquid crystal copolymer compound of the present invention can be produced by, when, for example, it is a polymeric liquid crystal copolymer compound of a polyvinyl type or polyoxyalkylene type, subjecting the corresponding plural kinds of monomers to radical polymerization, anionic polymerization or cationic polymerization. When, for example, it is a polymeric liquid crystal copolymer compound of a polyester type, it can be produced by subjecting the corresponding plural kinds of diols and dicarboxylic acids to condensation polymerization.

This polymeric liquid crystal copolymer compound may preferably have a number average molecular weight of 2,000 to 1,000,000, and more preferably 4,000 to 500,000. A molecular weight less than 2,000 may result in poor film properties of the polymeric liquid crystal copolymer compound to cause a difficulty when a coating film is formed. A molecular weight more than 1,000,000 may make poor the response to an external field with an increase in viscosity.

The method of producing the polymeric liquid crystal copolymer compound of the present invention is by no means limited to the methods described above.

In the second embodiment of the present invention, specific structures of the repeating unit represented by the formula (Ib) can be exemplified by the following:

In the case when $A^1$ is a substituted or unsubstituted alkyl group having 3 or more carbon atoms, it may include:

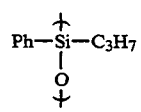     1°

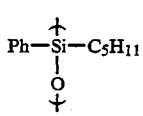     2°

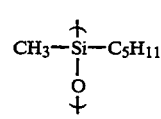     3°

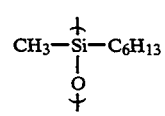     4°

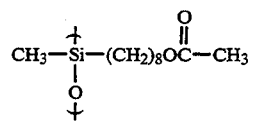     5°

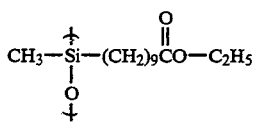     6°

In the case when $A^1$ is a polyoxyalkylene group, it may include:

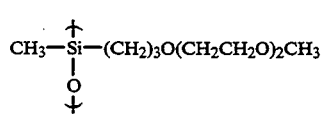     1)

2)
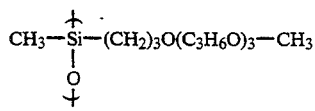
3)
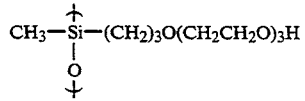
4)
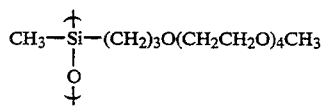
In the case when A¹ is an aryl group, it may include:
i)
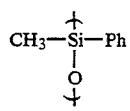
ii)
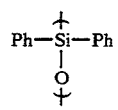
In the case when A¹ is
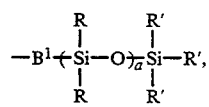
it may include:
1
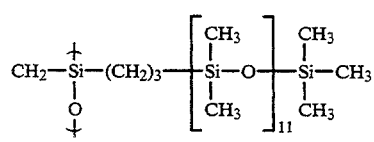
2
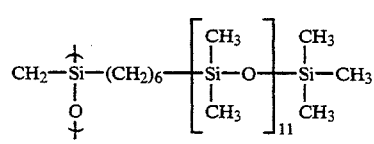
3
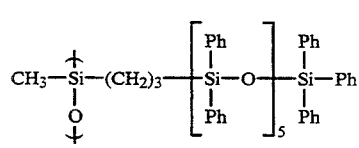
4
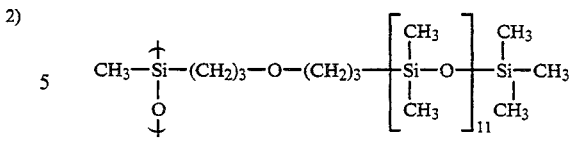
5
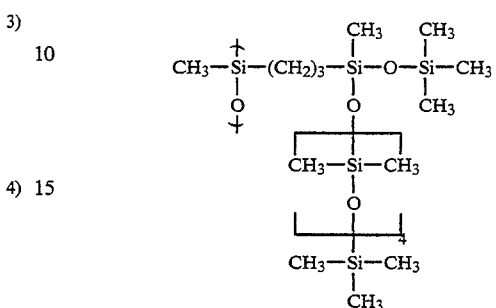
6
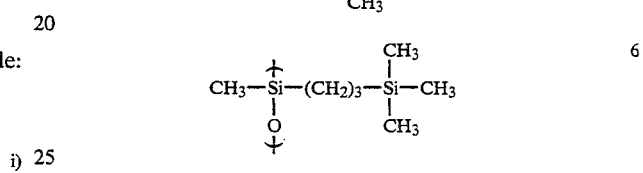
7
8
9
10
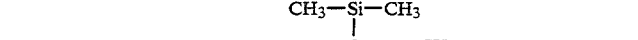
11
In the polymeric liquid crystal copolymer compound according to the second embodiment of the present invention, a copolymerizing repeating unit other than the repeating unit represented by the formula (Ib) may preferably have a structure wherein a mesogen is bonded to the polymeric main chain through a spacer, i.e., a structure having what is called a crystal-forming ability.

The polymeric liquid crystal copolymer compound of the present invention may preferably have an optically active group and also have ferroelectric properties.

The polymeric liquid crystal copolymer compound of the present invention may have any crystal phase such as a nematic phase, a cholesteric phase, a smectic phase or a chiral smectic phase. When it is a nematic liquid crystal, it can be applied in TN liquid crystals. When it is a cholesteric liquid crystal, it can be applied in the formation of a thin film having a selective reflection wavelength. When it is a chiral smectic liquid crystal, it can be applied as a bistable ferroelectric liquid crystal to give a liquid crystal device having an excellent response. In both instances, it is possible to readily obtain a large-area liquid crystal device. Thus, both the instances are particularly preferred.

The copolymerizing repeating unit other than the repeating unit represented by the formula (Ib) in the polymeric liquid crystal copolymer compound according to the second embodiment of the present invention may have a structure represented by the following formula B.

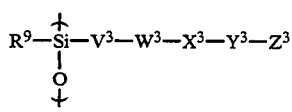

[B]

wherein R$^9$ represents an alkyl group or a phenyl group, V$^3$ represents

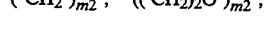

or a structure wherein at least one of hydrogen atoms of

may be substituted with an alkyl group, a halogen atom, a cyano group, an amino group or a carbonyl group, wherein m2 represents an integer of 0 to 30; W$^3$ represents a single bond, —O—, —OCO—, —COO—, —CONR$^8$, —CO— or —NR$^8$, wherein R$^8$ represents a hydrogen atom or an alkyl group; X$^3$ represents a mesogen, which represents a structure wherein at least two rings selected from substituted or unsubstituted homoaromatic rings, heterocyclic rings and alicyclic rings are linked with a single bond, —O—, —OCO—, —COO—,

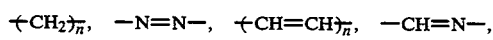

or —NR$^9$, wherein R$^9$ represents a hydrogen atom or an alkyl group and n represents an integer of 1 to 10, or may be a structure wherein at least two of said rings combine to form a condensed ring; Y$^3$ represents a single bond, —O— or —COO—; Z$^3$ represents a substituted or unsubstituted alkyl group, a hydrogen atom, —CN, or a halogen atom. Stated specifically, the above unit can be exemplified by the following:

First, a structure capable of readily rendering a nematic liquid crystal includes, for example, the following:

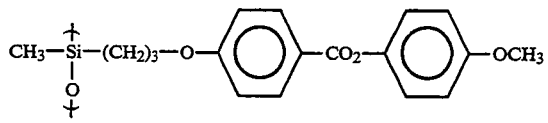

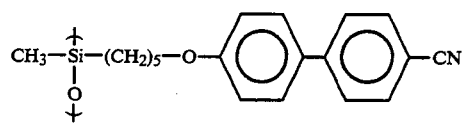

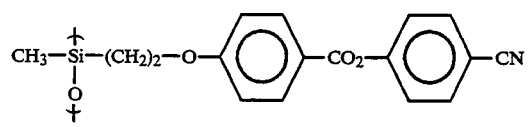

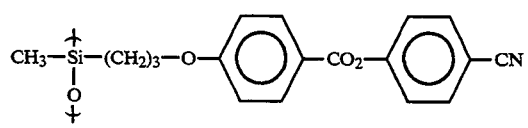

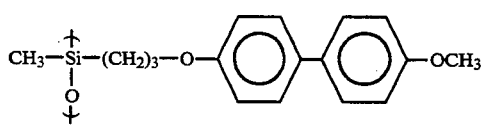

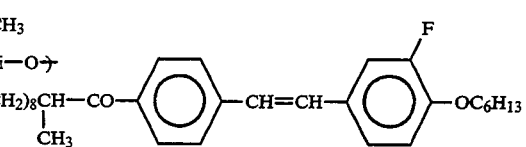

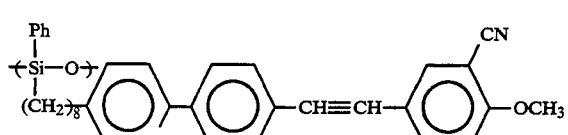

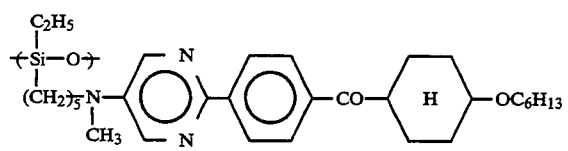

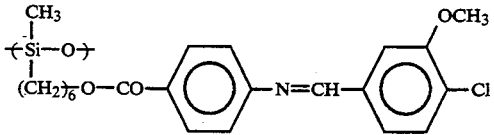

-continued

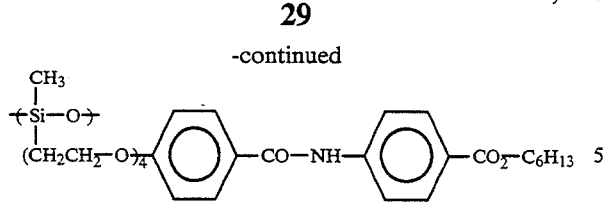

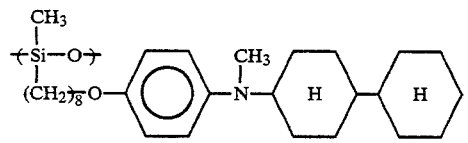

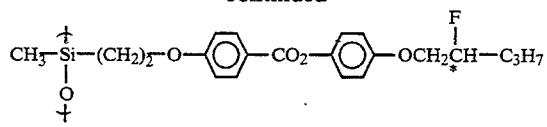

The asterisk * represents an asymmetric carbon atom.

A structure capable of readily rendering a chiral smecticic liquid crystal includes, for example, the following:

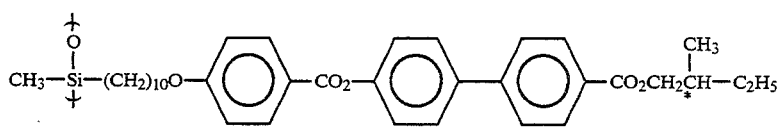

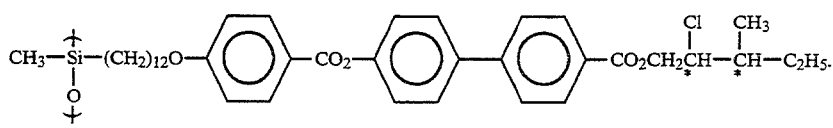

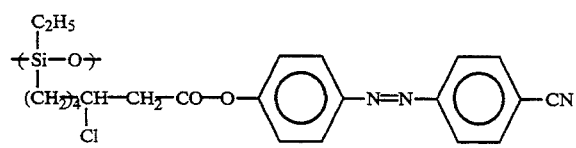

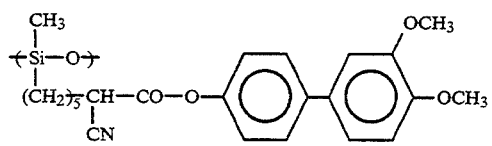

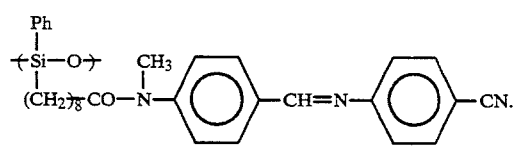

A structure capable of readily rendering a cholesteric liquid crystal includes, for example, the following:

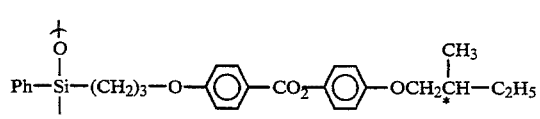

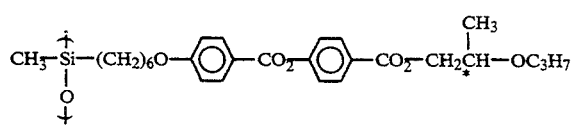

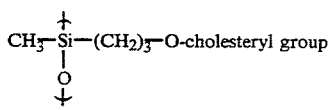

In particular, in view of the advantages that a superior response can be achieved because of a large spontaneous polarization and also a chiral smectic phase can be exhibited over a wide temperature range, the repeating unit other than the repeating unit represented by the formula (Ib) may preferably be a repeating unit represented by the following formula (IIb) or (IIIb).

The repeating unit represented by the formula (IIb) is as follows:

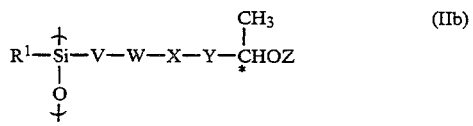

wherein $R^1$ represents an alkyl group or a phenyl group; V represents

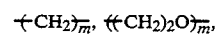

or a structure wherein at least one of hydrogen atoms of

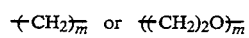

may be substituted with an alkyl group, a halogen atom, a cyano group, an amino group or a carbonyl group, wherein m represents an integer of 0 to 30; W represents a single bond, —O—, —OCO—, —COO—, —CONR$^3$, —CO— or —NR$^3$, wherein R$^3$ represents a hydrogen atom or an alkyl group; X represents a mesogen, which represents a structure wherein at least two rings selected from substituted or unsubstituted homo-aromatic rings, heterocyclic rings and alicyclic rings are linked with a single bond, —O—, —OCO—, —COO—,

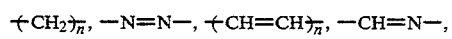

-continued $$-N=CH-, \;\; +C\equiv C\overline{)_n}, \;\; -CONR^3, \;\; +CO\overline{)_n}$$

or —$NR^3$, wherein $R^3$ represents a hydrogen atom or an alkyl group and n represents an integer of 1 to 10, or may be a structure wherein at least two of said rings combine to form a condensed ring; Y represents —$COOCH_2$—, —O—$CH_2$— or —OCO—; the asterisk * represents an asymmetric carbon atom; and Z represents —$R^2$ or —$COR^2$, wherein $R^2$ represents a hydrogen atom or a substituted or unsubstituted alkyl group.

The above repeating unit can be exemplified by the following:

(In the following, m represents an integer of 0 to 30.)

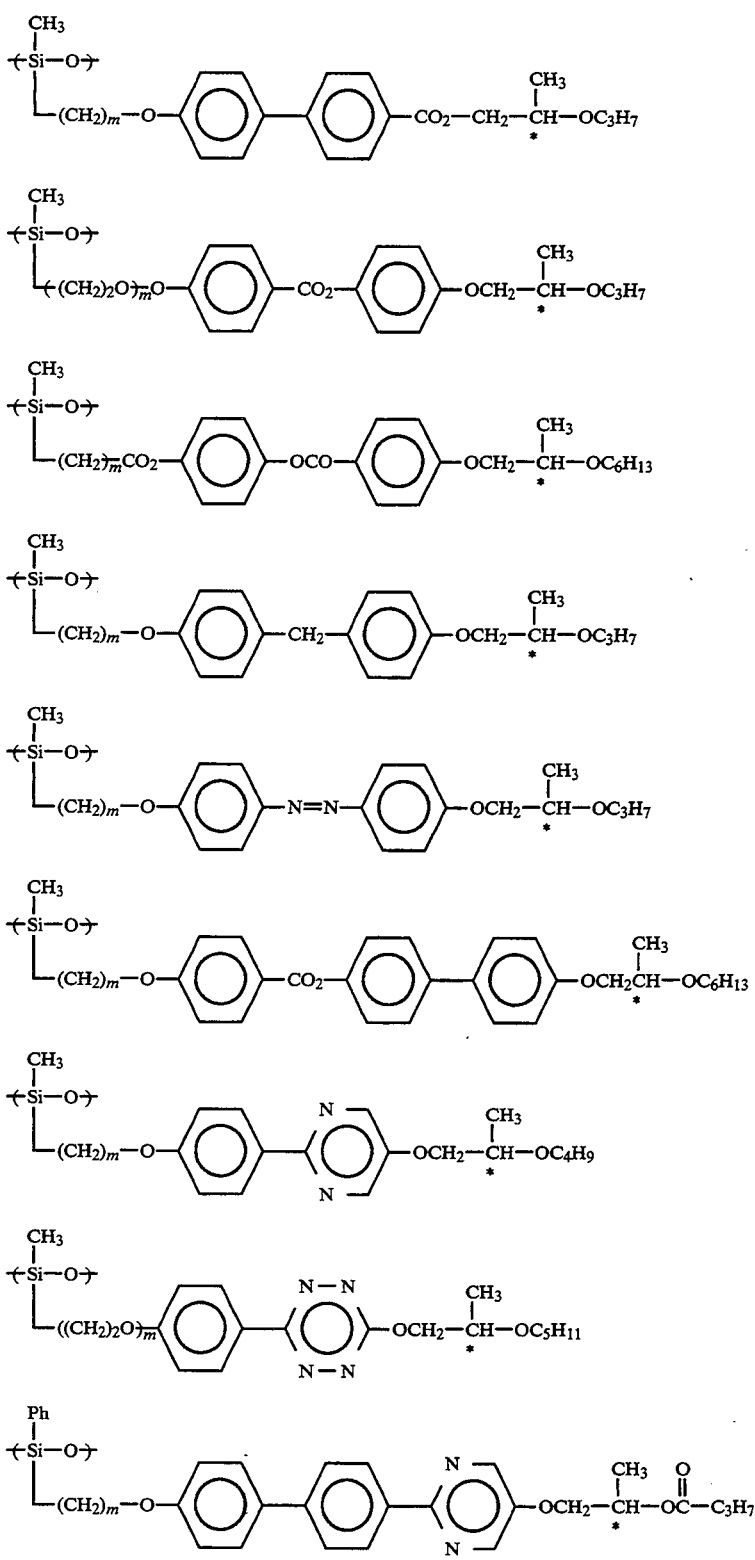

-continued
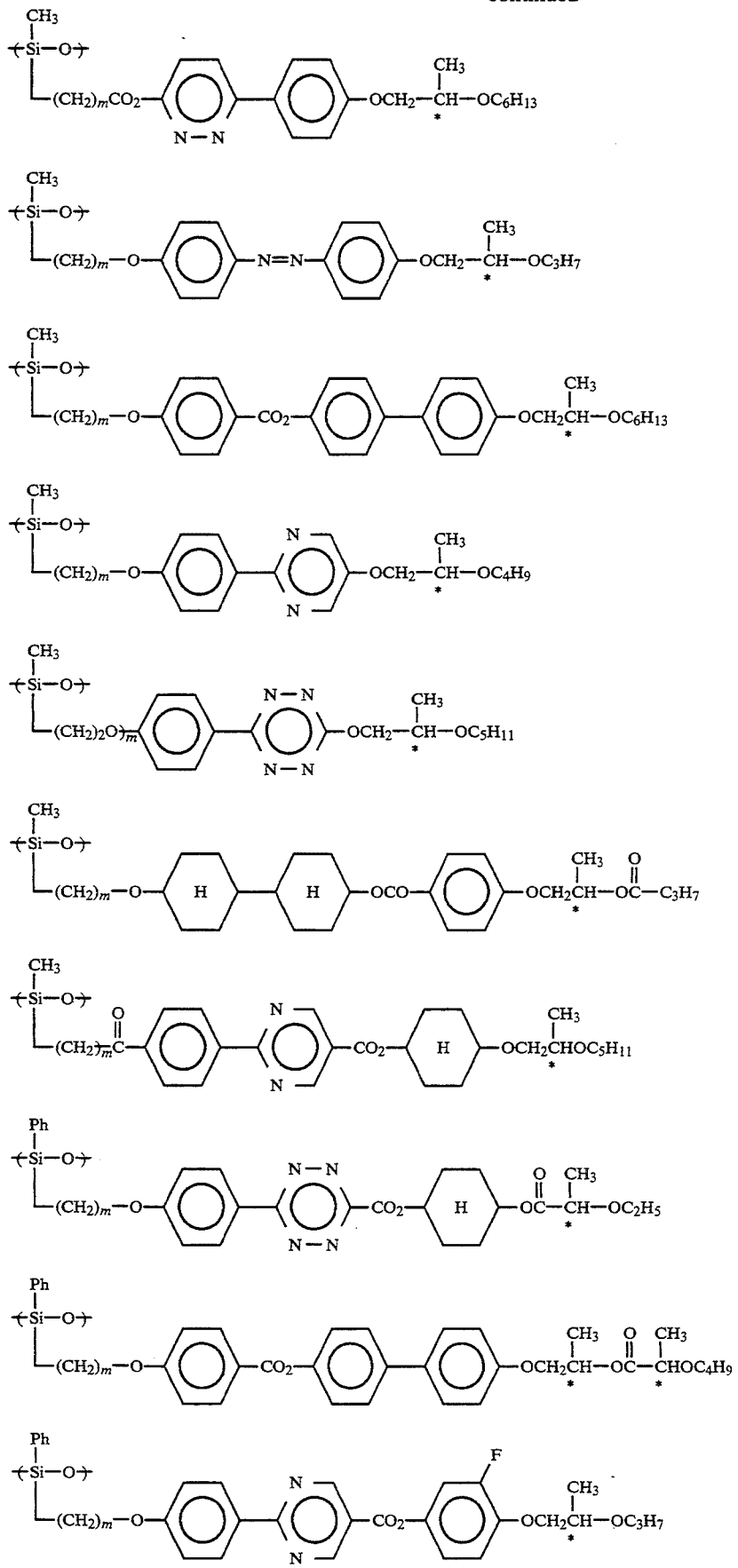

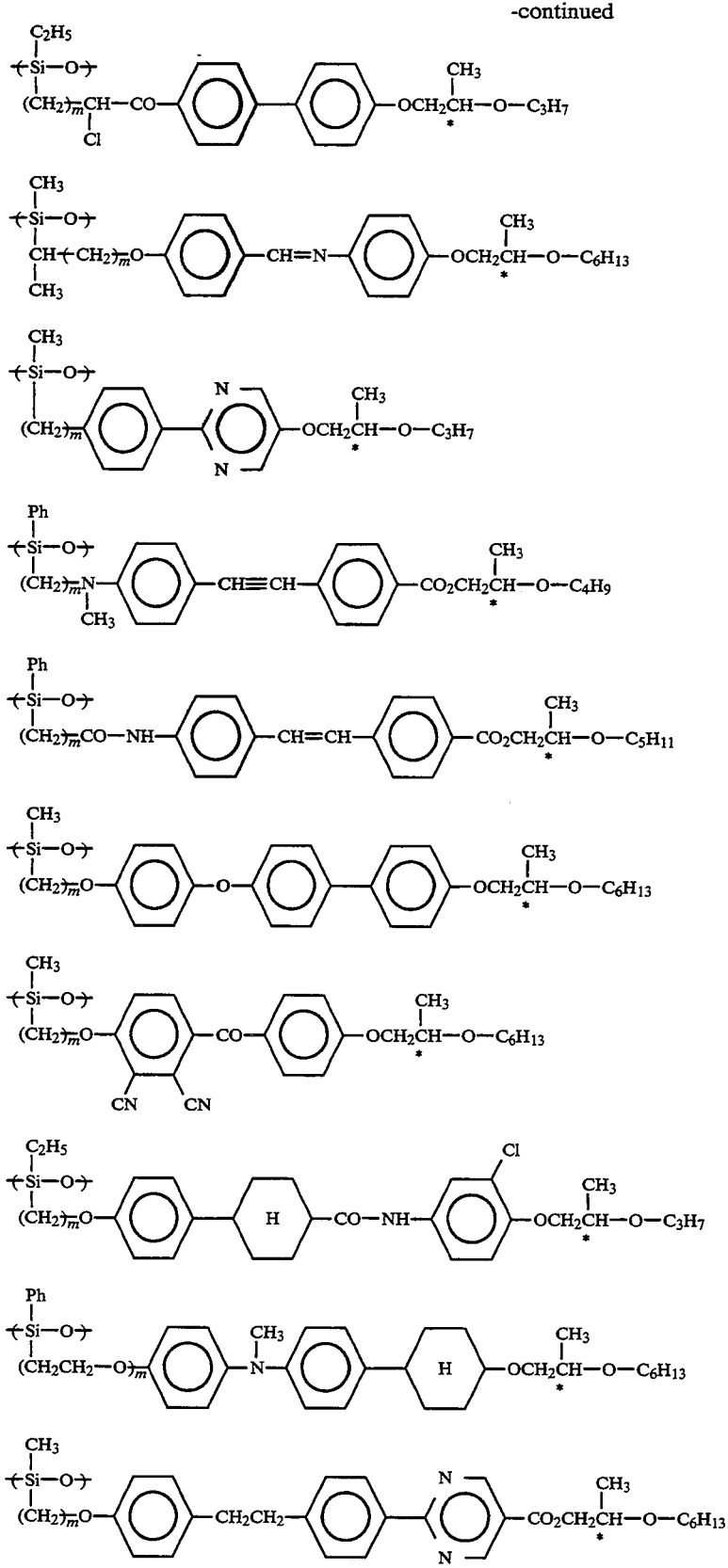
The repeating unit represented by the formula (IIIb) is as follows:

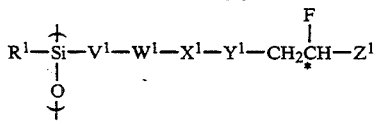
(IIIb)

wherein $R^1$ represents an alkyl group or a phenyl group; $V^1$ represents

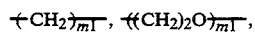

or a structure wherein at least one of hydrogen atoms of

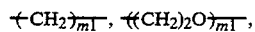

may be substituted with an alkyl group, a halogen atom, a cyano group, an amino group or a carbonyl group, wherein m1 represents an integer of 0 to 30; $W^1$ represents a single bond, —O—, —OCO—, —COO—, —CONR$^{3'}$, —CO— or —NR$^{3'}$, wherein R$^{3'}$ represents a hydrogen atom or an alkyl group; $X^1$ represents a mesogen, which represents a structure wherein at least two rings selected from substituted or unsubstituted homo-aromatic rings, heterocyclic rings and alicyclic rings are linked with a single bond, —O—, —OCO—, —COO—,

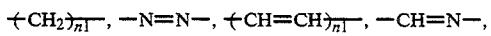

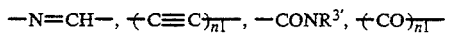

or —NR$^{3'}$, wherein R$^{3'}$ represents a hydrogen atom or an alkyl group and n1 represents an integer of 1 to 10; $Y^1$ represents a single bond, —O— or —COO—; Z1 represents a substituted or unsubstituted alkyl group; and the asterisk * represents an asymmetric carbon atom.

The above repeating unit can be exemplified by the following:
(In the following, ml represents an integer of 0 to 30.)

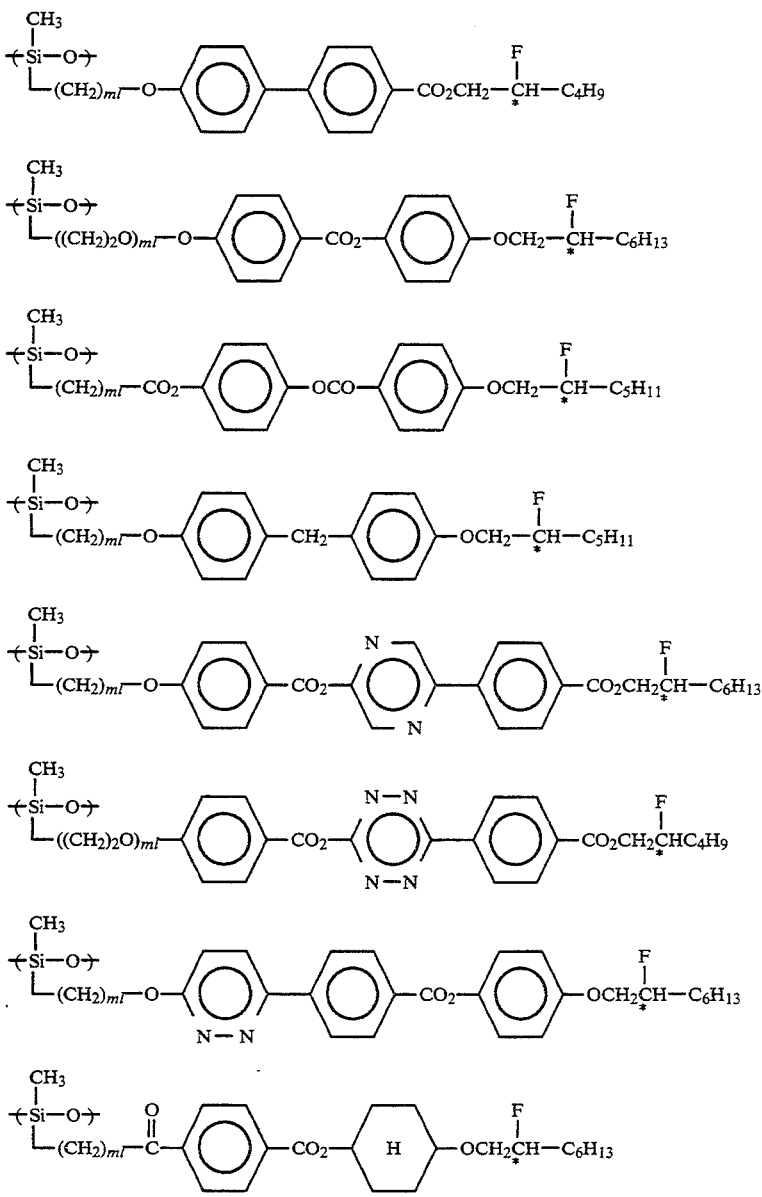

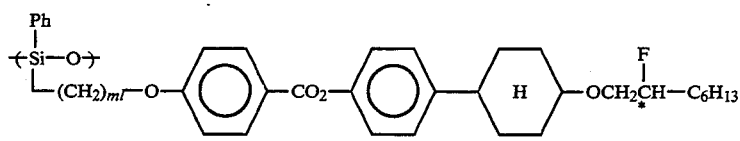
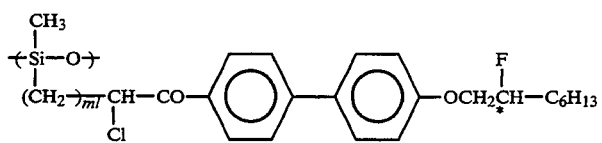
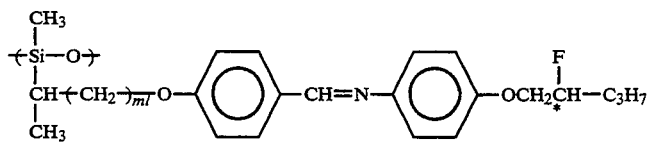
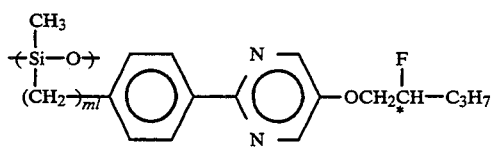
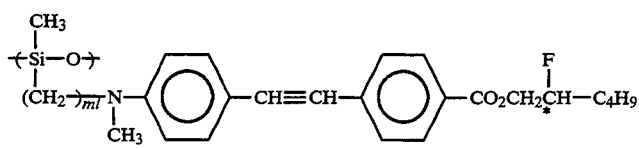
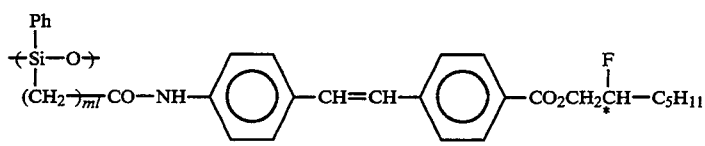
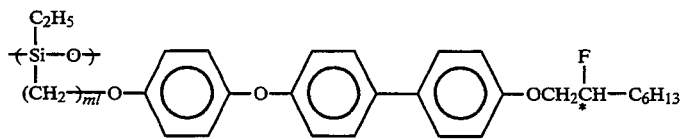
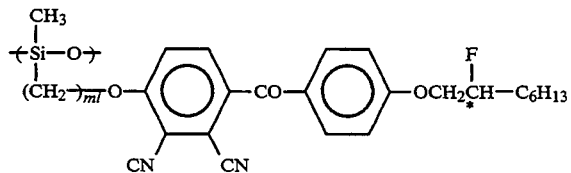
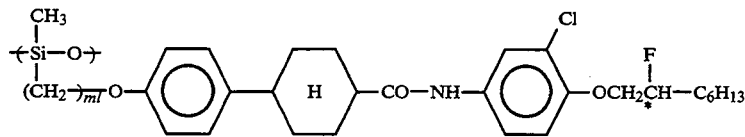
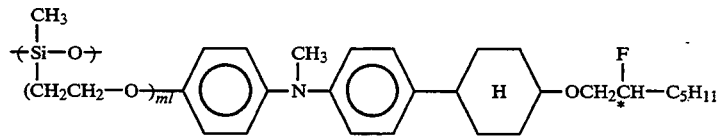

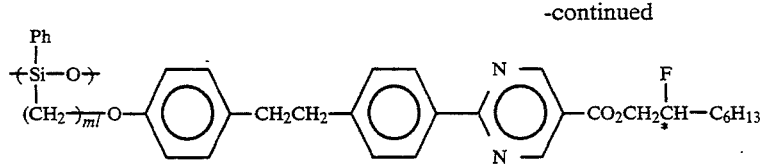

The polymeric liquid crystal copolymer compound according to the first embodiment of the present invention is comprised of the repeating unit represented by the formula (Ib) and the repeating unit other than the repeating unit represented by the formula (Ib), as exemplified in the above. Since this polymeric liquid crystal copolymer compound is comprised of a siloxane main chain, it has originally a lower viscosity than those having a carbon type main-chain structure such as a methacrylic main chain or acrylic main chain. In addition to this main chain, it has as a component the repeating unit represented by the formula (Ib), i.e., an alkyl group, a polyoxyalkylene group, an aryl group, a silyl group or a siloxane group in its side chain, and hence its viscosity is further decreased. Thus, it can have a very good response to an external field.

In the polymeric liquid crystal copolymer compound of the present invention, the viscosity reducing component, the repeating unit represented by the formula (Ib), is introduced as a polymerizing component through a chemical bond, and hence the compound is also superior in that it is a homogeneous and uniform compound. In instances in which the viscosity reducing agent having the structure represented by the formula (Ib) and a polymeric liquid crystal are blended, there is no compatibility between them in almost all instances to cause phase separation. On the other hand, in the polymeric liquid crystal copolymer compound of the present invention is free from such a disadvantage, presenting a contrast with such instances.

The repeating unit represented by the formula (Ib) in the polymeric liquid crystal copolymer compound of the present invention should preferably be contained in an amount ranging from 1 mol % to 95 mol %, and more preferably from 5 mol % to 90 mol %. An amount less than 1 mol % may bring about no remarkable viscosity reducing action, and an amount more than 95 mol % may result in no formation of a liquid crystal.

The polymeric liquid crystal copolymer compound of the present invention can be commonly produced by copolymerization of a monomer or oligomer component corresponding to the repeating unit represented by the formula (Ib) with a monomer or oligomer component capable of forming a liquid crystal. It can be more commonly produced by hydrosililation addition of a side-chain component of a vinyl group terminal to a polymethylhydrogensiloxane or polyarylhydrogensiloxane main chain, like the reaction of grafting.

This polymeric liquid crystal copolymer compound may preferably have a number average molecular weight of 2,000 to 1,000,000, and more preferably 4,000 to 500,000. A molecular weight less than 2,000 may result in poor film properties of the polymeric liquid crystal copolymer compound to cause a difficulty when a coating film is formed. A molecular weight more than 1,000,000 may make poor the response to an external field with an increase in viscosity.

The method of producing the polymeric liquid crystal copolymer compound of the present invention is by no means limited to the methods described above.

The present invention also provides a polymeric liquid crystal composition containing as a blend component at least one polymeric liquid crystal copolymer compound having the repeating unit represented by the formula (Ia) or (Ib) described above. Other blend component may preferably be a polymeric compound, a polymeric liquid crystal, a low-molecular compound or a low-molecular liquid crystal. In particular, a polymeric liquid crystal or a low-molecular liquid crystal is preferred.

Examples of the polymeric liquid crystal blended with the polymeric liquid crystal copolymer compound having the repeating unit represented by the formula (Ia) or (Ib) are shown below.

(In the following, $R^6$ represents a hydrogen atom, an alkyl group or a halogen atom, and p represents an integer of 0 to 30.)

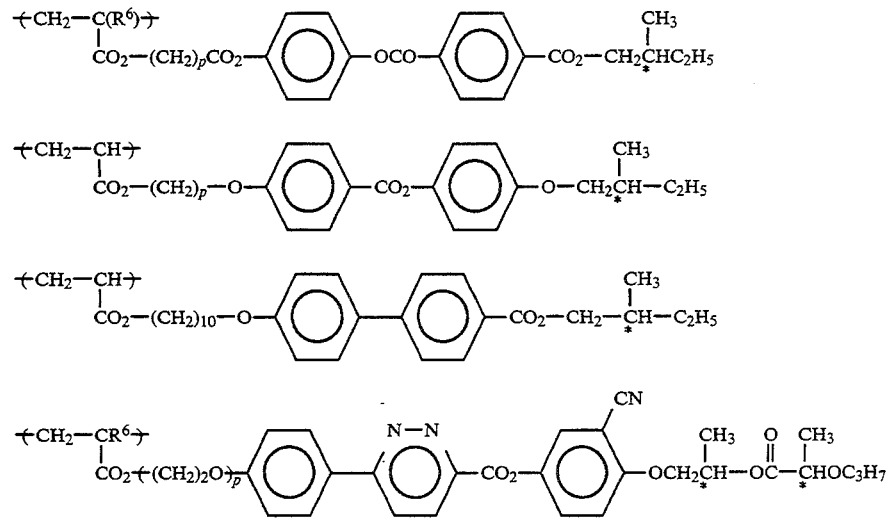

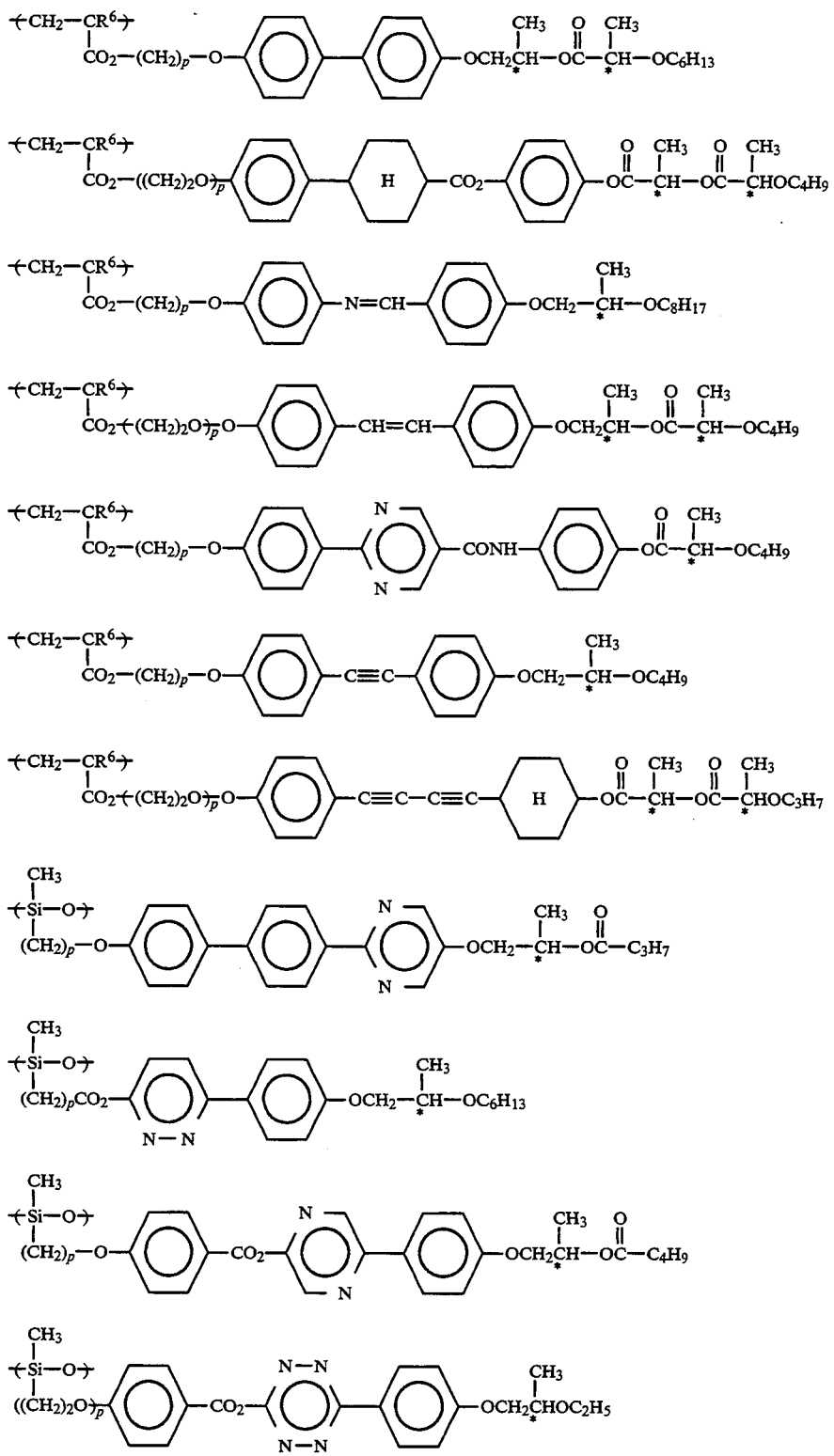
As examples of the low-molecular liquid crystal, it may include the following compounds. (In the following, "Cryst." refers to "Crystal phase"; "Iso.", "Isotropic phase" and "Cholest.", "Cholesteric phase".)
(1)

-continued

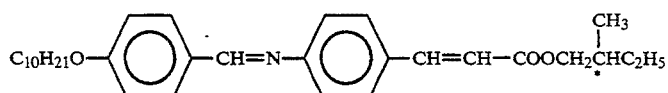

p-Decyloxybenzylidene-p'-amino-2-methylbutyl cinnamate (DOBAMBC)

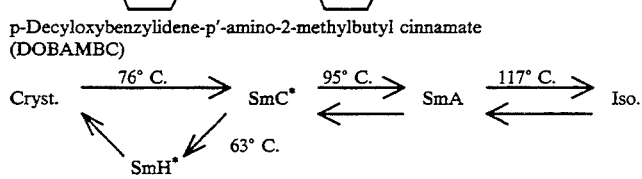

(2)

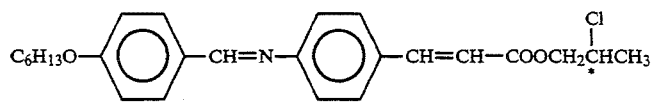

p-Hexyloxybenzylidene-p'-amino-2-chloropropyl cinnamate (HOBACPC)

Cryst. $\xrightleftharpoons{60° C.}$ SmH* $\xrightleftharpoons{64° C.}$ SmC* $\xrightleftharpoons{78° C.}$ SmA $\rightleftharpoons$ Iso.

(3)

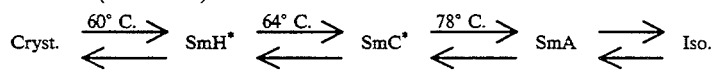

p-Decyloxybenzylidene-p'-amino-2-methylbutyl-α-cyanocinnamate (DOBAMBCC)

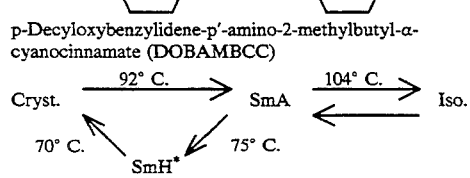

(4)

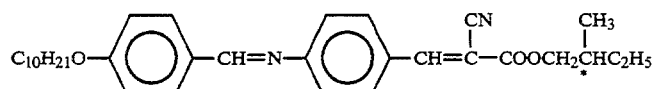

p-Tetradecyloxybenzylidene-p'-amino-2-methylbutyl-α-cyanocinnamate (TDOBAMBCC)

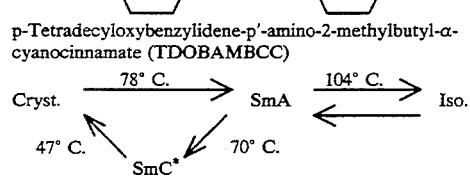

(5)

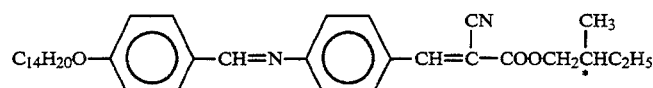

p-Octyloxybenzylidene-p'-amino-2-methylbutyl-α-chlorocinnamate (OOBAMBCC)

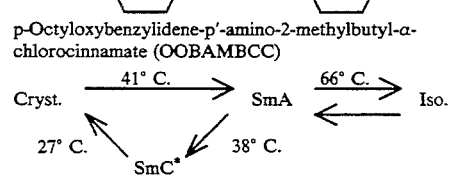

(6)

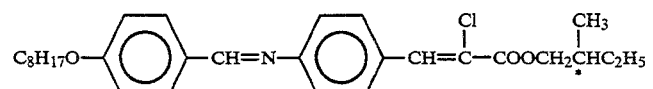

p-Octyloxybenzylidene-p'-amino-2-methylbutyl-α-methylcinnamate

Cryst. $\xrightleftharpoons{49° C.}$ SmC* $\xrightleftharpoons{58° C.}$ SmA $\xrightleftharpoons{94° C.}$ Iso.

(7)

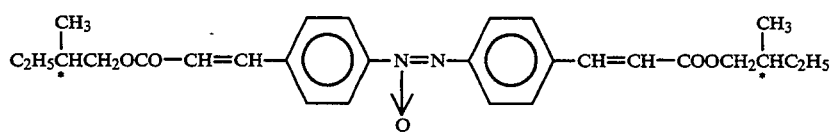

4,4'-Azixycinnamic acid-bis(2-methylbutyl) ester

Cryst. $\xrightleftharpoons{121°\text{ C.}}$ SmC* $\xrightleftharpoons{134°\text{ C.}}$ SmA $\xrightleftharpoons{168°\text{ C.}}$ Iso.

(8)

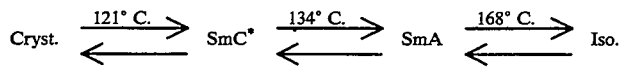

4-o-(2-Methyl)butylresorcylidene-4'-octylaniline (MBRA 8)

Cryst. $\xrightleftharpoons{28°\text{ C.}}$ SmC* $\xrightleftharpoons{55°\text{ C.}}$ SmA $\xrightleftharpoons{62°\text{ C.}}$ Iso.

(9)

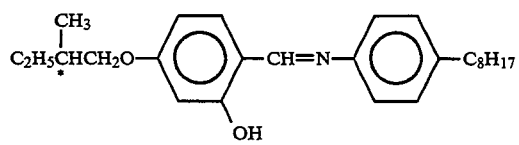

4-(2'-Methylbutyl)phenyl-4'-octyloxybiphenyl-4-carboxylate

Cryst. $\xrightleftharpoons{78°\text{ C.}}$ Sm3 $\xrightleftharpoons{80°\text{ C.}}$ SmC* $\xrightleftharpoons{128.3°\text{ C.}}$ SmA $\xrightleftharpoons{171.0°\text{ C.}}$ Cholest. $\xrightleftharpoons{174.2°\text{ C.}}$ Iso.

(10)

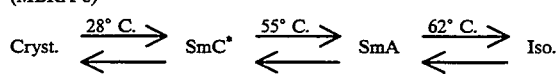

4-Hexyloxyphenyl-4-(2''-methylbutyl)biphenyl-4'-carboxylate

Cryst. $\xrightleftharpoons{68.8°\text{ C.}}$ SmC* $\xrightleftharpoons{80.2°\text{ C.}}$ Cholest. $\xrightleftharpoons{163.5°\text{ C.}}$ Iso.

(11)

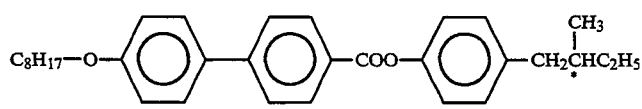

4-Octyloxyphenyl-4-(2''-methylbutyl)biphenyl-4'-carboxylate

Cryst. $\xrightleftharpoons{76°\text{ C.}}$ SmC* $\xrightleftharpoons{88.6°\text{ C.}}$ Cholest. $\xrightleftharpoons{155.4°\text{ C.}}$ Iso.

(12)

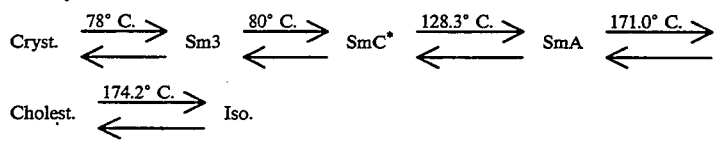

4-Hexyloxyphenyl-4-(2''-methylbutyl)biphenyl-4'-carboxylate

Cryst. $\xrightleftharpoons{91.5°\text{ C.}}$ SmC* $\xrightleftharpoons{93°\text{ C.}}$ SmA $\xrightleftharpoons{112°\text{ C.}}$ Cholest. $\xrightleftharpoons{131°\text{ C.}}$ Iso.

(13)

-continued

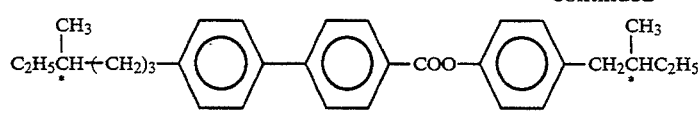

4-(2''-methylbutyl)phenyl-4-(4''-methylhexyl)biphenyl-4'-carboxylate

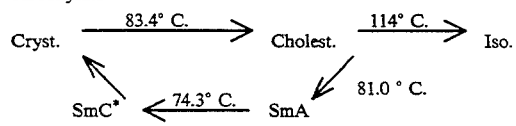

(14)

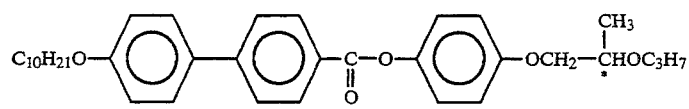

4-(2'-(propyloxy)propyl)oxyphenyl-4-(decyloxy)biphenyl-4'-carboxylate

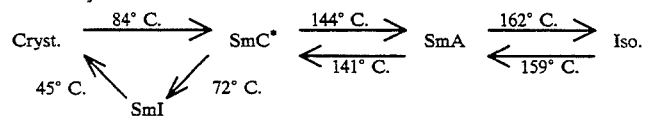

(15)

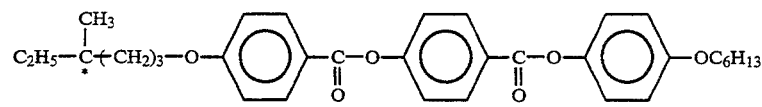

(4'-(4-hexyloxy)phenyloxycarbonyl)phenyl-p-(4''-methylhexyloxy)benzoate

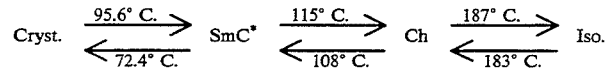

There are no particular limitations on the polymeric compound that may be blended in the polymeric liquid crystal copolymer compound having the repeating unit represented by the formula (Ia) or (Ib). Any of those commonly blended in polymeric liquid crystals can be used, including, for example, compounds such as polyvinyl chloride, polyesters and polyurethanes.

There are also no particular limitations on the low-molecular compound that may be blended. Any of those commonly blended in polymeric liquid crystals can be used, including, for example, long-chain or short-chain aliphatic compounds, siloxane compounds and biphenyl compounds.

The polymeric liquid crystal copolymer compound of the present invention may be contained in the polymeric liquid crystal composition according to the present invention in an amount of usually not less than 5% by weight, preferably not less than 10% by weight, and more preferably 15% by weight to 90% by weight. An amount less than 5% by weight may result in insufficient formability, strength and film-forming properties.

The polymeric compound, polymeric liquid crystal, low-molecular compound or low-molecular liquid crystal may be contained in the polymeric liquid crystal composition according to the present invention in an amount of usually 10% by weight to 95% by weight, and preferably 15% by weight to 90% by weight.

A coloring matter, a light stabilizer, a plasticizer, a light absorber, etc. can also be added to the polymeric liquid crystal copolymer compound according to the present invention and the polymeric liquid crystal composition containing it.

The present invention further provides a polymeric liquid crystal device comprising the polymeric liquid crystal copolymer compound having the repeating unit represented by the formula (Ia) or (Ib), or the polymeric liquid crystal composition containing as a blend component at least one polymeric liquid crystal copolymer compound having said repeating unit.

A film of the polymeric liquid crystal copolymer compound or polymeric liquid crystal composition of the present invention is formed by coating or the like on a substrate made of any desired material such as glass, plastic or metal. It is also possible to form on the substrate a transparent electrode comprising an ITO film or a patternized electrode.

Alignment treatment can be exemplified by the following:

(1) Horizontal alignment (Molecular axes of the polymeric liquid crystal copolymer compound or polymeric liquid crystal composition are oriented in parallel to the surface of a substrate):

(i) Rubbing

On a substrate, a film of, e.g., an inorganic insulating material such as silicon monoxide, silicon dioxide, aluminum oxide, zirconium oxide, magnesium fluoride, cerium oxide, cerium fluoride, silicon nitride, silicon carbide or boron nitride or an organic insulating material such as polyvinyl alcohol, polyimide, polyamidoimide, polyester imide, polyparaxylene, polyester, polycarbonate, polyvinyl acetal, polyvinyl chloride, polyamide, polystyrene, cellulose resin, melamine resin, urea resin or acrylic resin, is formed by solution coating, vacuum deposition or sputtering, and thereafter the surface of the film formed is rubbed with velvet, cloth or paper in a given direction to form an alignment control film.

(ii) Oblique vacuum deposition

An oxide such as SiO, a fluoride, or a metal such as Au or Al or an oxide thereof is vacuum-deposited on a substrate at an oblique angle.

(iii) Oblique etching

The organic or inorganic insulating material as shown in paragraph (i) is etched by irradiation with an ion beam or oxygen plasma to form an alignment control film.

(iv) Use of a stretched polymeric film

A polymeric film comprised of polyester, polyvinyl alcohol or the like is stretched.

(v) Grating method

Grooves are formed by photolithography, by the use of a stamper or by injection. In this instance, the polymeric liquid crystal copolymer compound or polymeric liquid crystal composition is aligned in the direction of the grooves.

(vi) Shearing

The polymeric liquid crystal copolymer compound or polymeric liquid crystal composition is aligned by applying a shear stress at a temperature higher than the temperature at which the state of a liquid crystal is kept.

(vii) Stretching

A film is aligned by monoaxial stretching or biaxial stretching. It may be stretched together with a substrate made of polyester, polyvinyl alcohol or the like.

(2) Vertical alignment (Molecular axes of the polymeric liquid crystal copolymer compound or polymeric liquid crystal composition are oriented in the direction perpendicular to the surface of a substrate):

(i) A vertical aligning film is formed

A layer with vertically aligning properties, comprising an organic silane, lecithin, polytetrafluoroethylene or the like is formed on the surface of a substrate.

(ii) Oblique vacuum deposition

According to the oblique vacuum deposition described in paragraph (1)-(ii), vertically aligning properties can be imparted by appropriately selecting the deposition angle while rotating the substrate. After the oblique vacuum deposition, the vertically aligning agent as shown in paragraph (i) may be coated.

After the alignment treatment has been applied, for example, an upper substrate having an electrode may be provided to obtain a switching device.

The polymeric liquid crystal device thus obtained can be used as a display device, a memory device or the like. Employment of the polymeric liquid crystal device making use of polymeric liquid crystal copolymer compound or polymeric liquid crystal composition having a chiral smectic phase with ferroelectric properties makes it possible to achieve high-speed switching. Because of its bistability, it is also possible to use the device as a large-area display device or memory device having a good memory performance. In order to achieve the bistability, there is a method in which the layer thickness is made small to eliminate spirals. Stated specifically, the layer thickness may preferably be 10 μm or less.

Since the polymeric liquid crystal copolymer compound of the present invention has a siloxane or oxyalkylene unit as a copolymerizing component, it has a remarkably lower viscosity than any conventional polymeric liquid crystal compounds and has a very good response to an external field. Another polymeric liquid crystal copolymer compound comprised of a siloxane main chain and also having an alkyl group, polyoxyalkylene group, aryl group, silyl group or siloxy group in its side chain also has a remarkably lower viscosity than the conventional polymeric liquid crystal compounds and has a very good response to an external field. Hence, use of the polymeric liquid crystal copolymer compound of the present invention in a liquid crystal device makes it possible to actually provide a large-area polymeric liquid crystal device having a high-speed switching performance.

The polymeric liquid crystal composition, which enjoys the low-viscosity good properties attributable to the above polymeric liquid crystal copolymer compound and which is a blend with other polymeric compound, polymeric liquid crystal, low-molecular compound or low-molecular liquid crystal, enables control of physical properties such as liquid-crystal temperature range, spontaneous polarization and spiral sense. The polymeric liquid crystal composition is also very useful for the fabrication of a large-area polymeric liquid crystal device having a high-speed switching performance.

EXAMPLES

The present invention will now be described below in greater detail by giving Examples. The present invention is by no means limited to these Examples.

Example 1

0.800 g of monomer (1) and 0.200 g of monomer (2), represented by the structural formulas shown below, were put in toluene and then AIBN (azobisisobutylonitrile) was added as radical polymerization initiator. The mixture was freeze-deaerated, and then polymerization was carried out at 60° C. for 24 hours. Thereafter, reprecipitation was repeated using methanol to give 0.560 g of polymer (1a).

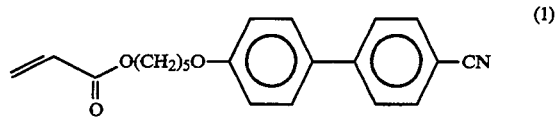

(1)

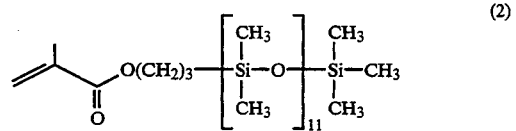

(2)

Phase transition temperature (°C.) of polymer (1a):

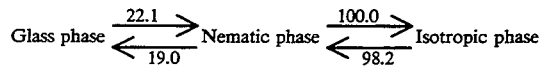

Number average molecular weight Mn by GPC (gel permeation chromatography), calculated as polystyrene: (hereinafter the number average molecular weight is meant by this): Mn=8,200

Example 2

0.500 g of monomer (3) represented by the structural formula shown below and 0.251 g of the above monomer (2) were polymerized and post-treated in the same manner as in Example 1 to give 0.305 g of polymer (2a). FIG. 1 shows $^1$H-NMR (in CDCl$_3$) of the polymer (2a).

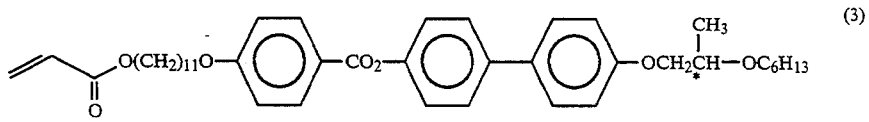

The asterisk * represents an asymmetric carbon atom.

Phase transition temperature (°C.) of polymer (2a):

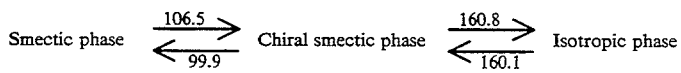

Mn = 12,500

Example 3

Figure 2:
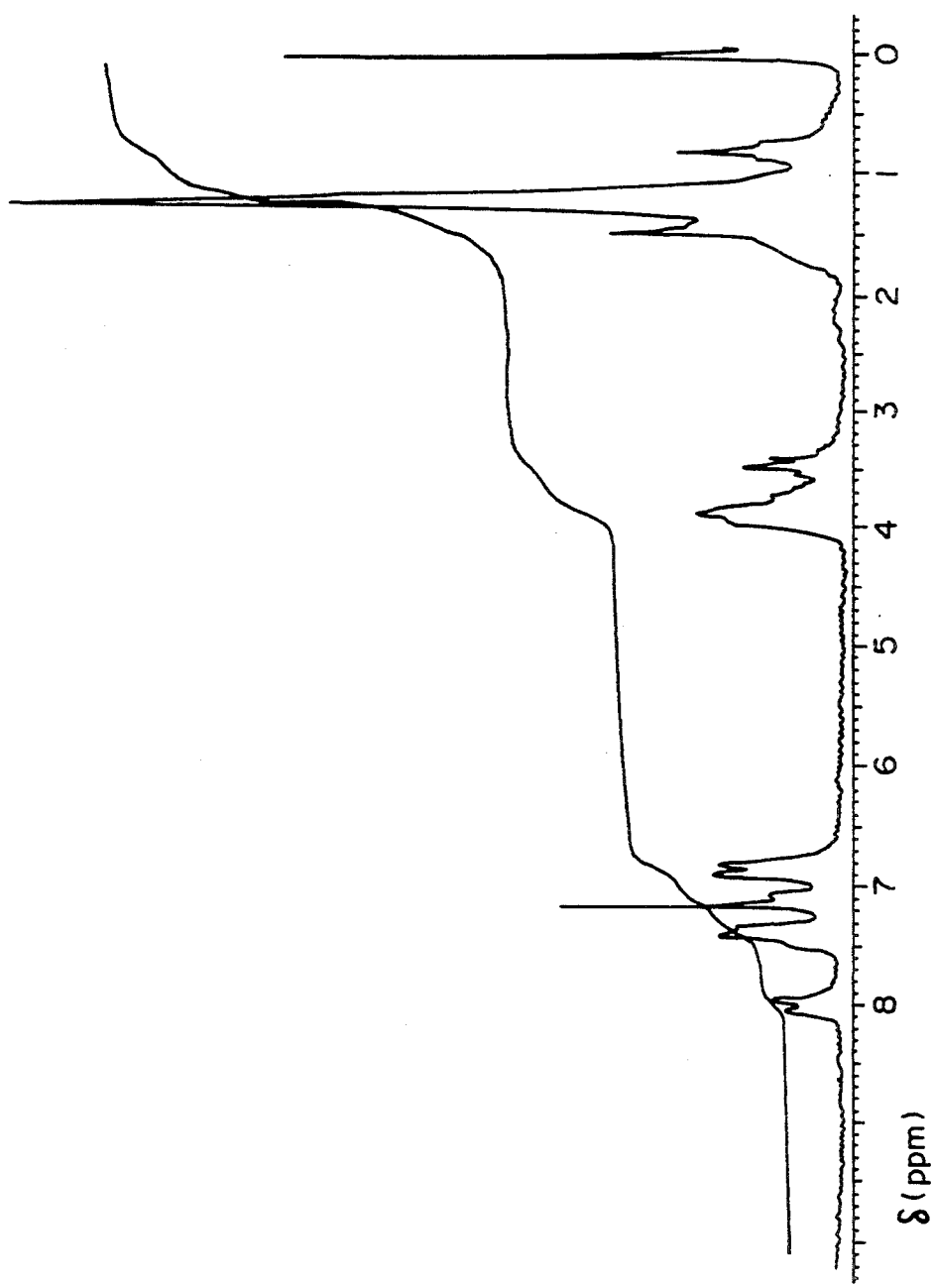

0.500 g of the above monomer (3) and 0.061 g of the above monomer (2) were polymerized and post-treated in the same manner as in Example 1 to give 0.225 g of polymer (3a). FIG. 2 shows $^1$H-NMR (in CDCl$_3$) of the polymer (3a).

In the followings; Smectic phase (1) and Smectic phase (2) are not identified phases. Phase transition temperature (°C.) of polymer (3a):

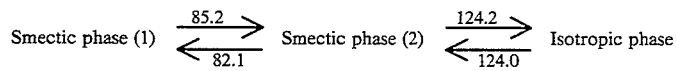

Mn = 11,100

Example 4

0.500 g of the above monomer (3) and 0.502 g of the above monomer (2) were polymerized and post-treated in the same manner as in Example 1 to give 0.342 g of polymer (4a).
Phase transition temperature (°C.) of polymer (4a):

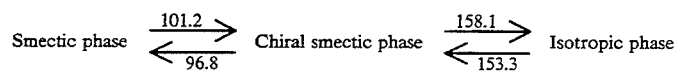

Mn = 15,000

Example 5

0.500 g of monomer (4) represented by the structural formula shown below and 0.218 g of the above monomer (2) were polymerized and post-treated in the same manner as in Example 1 to give 0.285 g of polymer (5a).

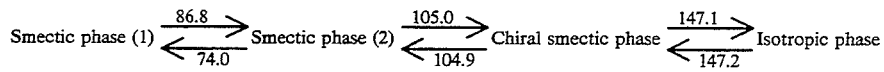

Phase transition temperature (°C.) of polymer (5a):

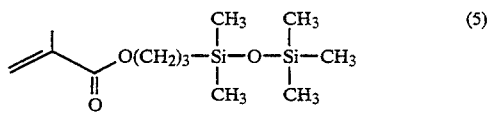

Mn = 7,900

Example 6

0.500 g of the above monomer (3) and 0.102 g of monomer (5) represented by the structural formula shown below were polymerized and post-treated in the same manner as in Example 1 to give 0.408 g of polymer (6a).

$$\begin{array}{c}\text{(5)}\end{array}$$

Phase transition temperature (°C.) of polymer (6a):

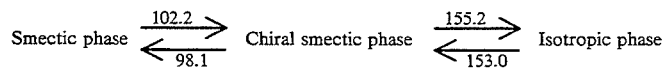

Mn = 15,800

Example 7

0.500 g of the above monomer (3) and 0.032 g of monomer (6) represented by the structural formula shown below were polymerized and post-treated in the same manner as in Example 1 to give 0.310 g of polymer (7a).

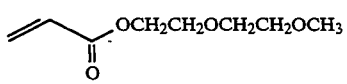 (6)

Phase transition temperature (°C.) of polymer (7a):

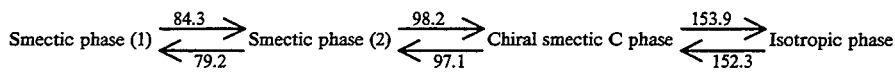

Mn = 11,500

Example 8

The polymeric liquid crystal copolymer compounds obtained in the above Examples, or polymeric liquid crystal compositions comprising any of these compounds and a low-molecular liquid crystal α1 or polymeric liquid crystal β1 were each applied to a glass plate provided with an ITO transparent electrode, on which a polyimide aligning film having been subjected to rubbing had been formed, by pressing, spin-coating or casting to form a film with a layer thickness of about 10 μm. Thereafter, annealing was carried out and then an upper electrode was attached. To the liquid crystal cell thus obtained, an electric field of 10 V/μm was applied in the state of an Sc* phase. At this time, molecules were observed reversing in response to the electric field. Response speeds were as shown in Table 1. The response speeds were determined by measuring polarization reverse currents.

Low-molecular liquid crystal α1

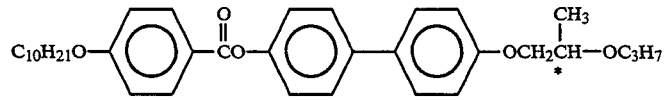

Polymeric liquid crystal β1

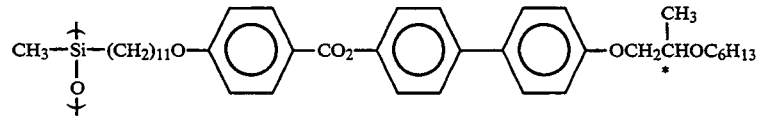

Mn = 17,100

TABLE 1

| Composition (weight ratio) | Response speed (ms) |
|---|---|
| (2a) | 0.08 |
| (3a) | 0.08 |
| (4a) | 0.10 |
| (6a) | 0.15 |
| (7a) | 0.28 |
| (5a):α1 = 5.1:4.9 | 0.21 |
| (3a):α1 = 7.5:2.5 | 0.17 |
| (4a):β1 = 5.2:4.8 | 0.45 |

TABLE 1-continued

| Composition (weight ratio) | Response speed (ms) |
|---|---|
| (7a):α1 = 4.2:5.8 | 0.34 |

Comparative Example 1

Response speed of a 1:1 composition comprised of the above polymeric liquid crystal β1 and a polymeric liquid crystal γ1 shown below was measured in the same manner as in Example 8 to reveal that its response speed was 2.5 ms.

Polymeric liquid crystal γ1

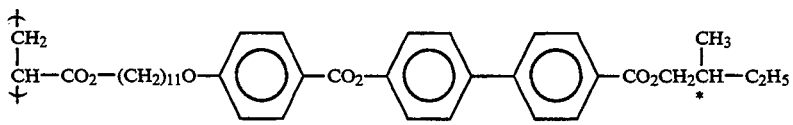

Mn = 12,100

Example 9

Figure 3:
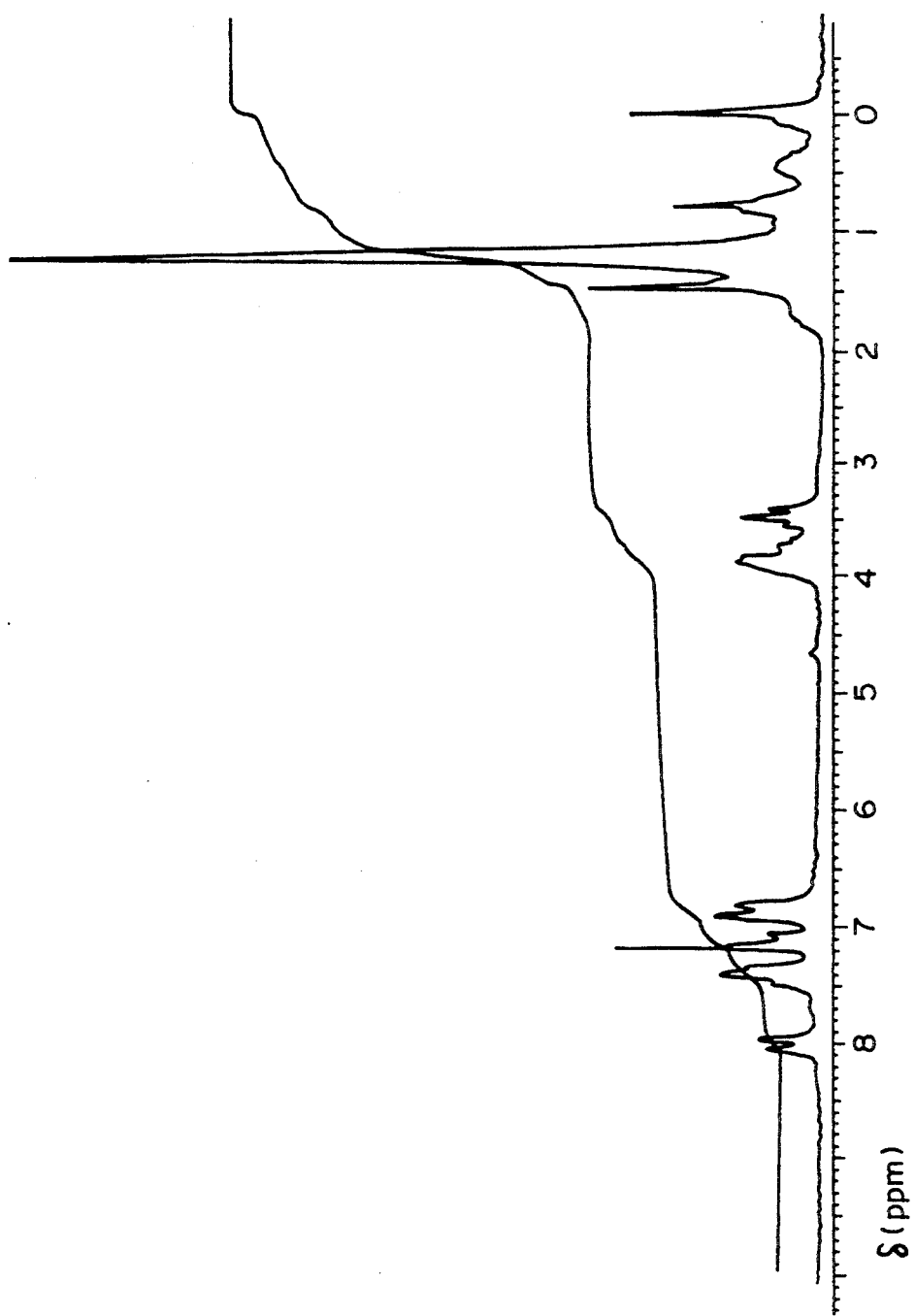

1.070 g of monomer (7) and 0.050 g of monomer (8), represented by the structural formulas shown below, were reacted in toluene together with 0.127 g of polymethylhydrogensiloxane (1b) (degree of polymerization: about 40) and a catalyst H₂PtCl₆·5H₂O. Thereafter, reprecipitation was repeated using a methanol-ether mixed solvent to give 0.756 g of polymer (9a). FIG. 3 shows ¹H-NMR (in CDCl₃) of the polymer (3a).

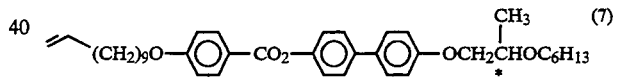 (7)

 (8)

Phase transition temperature (°C.) of polymer (9a):

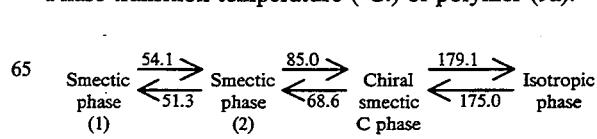

Number average molecular weight Mn by GPC (gel permeation chromatography), calculated as polystyrene: (hereinafter the number average molecular weight is meant by this): Mn=18,200

Example 10

Figure 4:
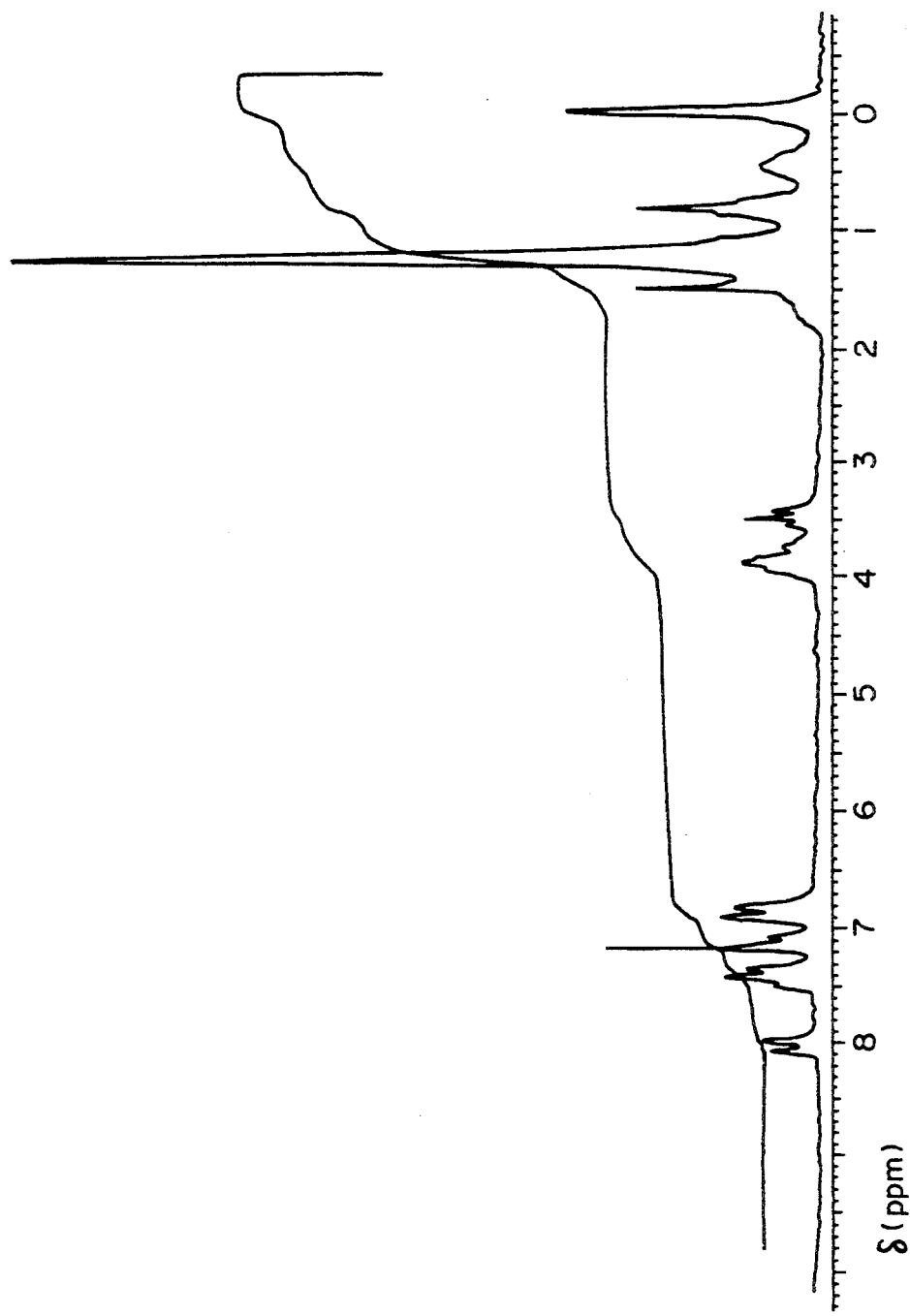

Using the monomer (7), monomer (8) and polymethylhydrogensiloxane (1b) of Example 9 in amounts of 0.876 g, 0.123 g and 0.191 g, respectively, the same procedure as in Example 9 was repeated to give 0.500 g of polymer (10a). FIG. 4 shows $^1$H-NMR (in CDCl$_3$) of the polymer (10a).
Phase transition temperature (°C.) of polymer (10a):

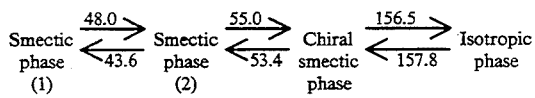

Mn=20,300

Example 11

Using the monomer (7), monomer (8) and polymethylhydrogensiloxane (1b) of Example 9 in amounts of 0.704 g, 0.296 g and 0.281 g, respectively, the same procedure as in Example 9 was repeated to give 0.690 g of polymer (11a).
Phase transition temperature (°C.) of polymer (11a):

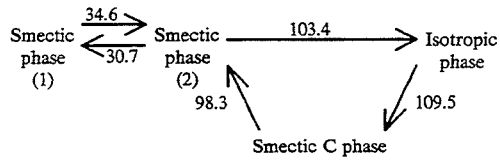

Mn=15,200

Example 12

Using 0.017 g of the monomer (7) of Example 9, 0.460 g of monomer (9) represented by the structural formula shown below and 0.066 g of polymethylhydrogensiloxane (1b), the same procedure as in Example 9 was repeated to give 0.281 g of polymer (12a).

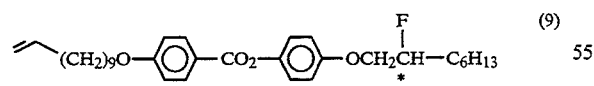

Phase transition temperature (°C.) of polymer (12a):

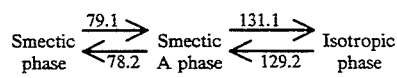

Mn=18,200

Example 13

Using 0.900 g of the monomer (7) of Example 9, 0.048 g of monomer (10) represented by the structural formula shown below and 0.108 g of polymethylhydrogensiloxane (1b), the same procedure as in Example 9 was repeated to give 0.602 g of polymer (13a).

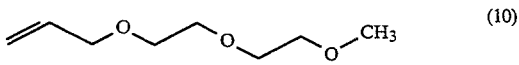

Phase transition temperature (°C.) of polymer (13a):

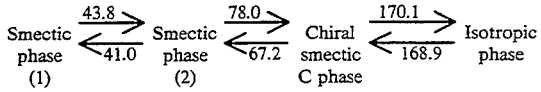

Mn=19,300

Example 14

Using 0.900 g of the monomer (7) of Example 9, 0.240 g of the monomer (10) of Example 13 and 0.179 g of polymethylhydrogensiloxane (1b), the same procedure as in Example 13 was repeated to give 0.523 g of polymer (14a).
Phase transition temperature (°C.) of polymer (14a):

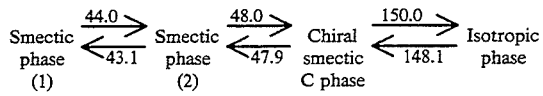

Mn=17,200

Example 15

Using 0.800 g of monomer (11) represented by the structural formula shown below, 0.046 g of the monomer (10) of Example 13, and 0.103 g of polymethylhydrogensiloxane (1b), the same procedure as in Example 9 was repeated to give 0.511 g of polymer (15a).

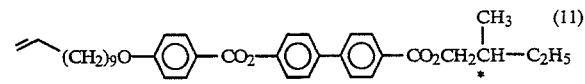

Phase transition temperature (°C.) of polymer (15a):

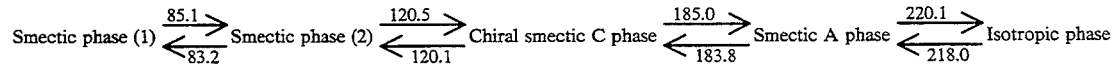

Mn=19,800

Example 16

Using 0.875 g of the monomer (7) of Example 9, 0.144 g of monomer (12) represented by the structural formula shown below and 0.096 g of polymethylhydrogensiloxane (1b), the same procedure as in Example 9 was repeated to give 0.623 g of polymer (16a).

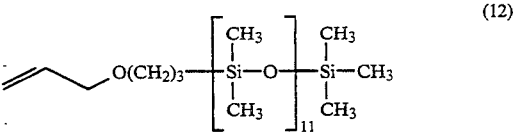

Phase transition temperature (°C.) of polymer (16a):

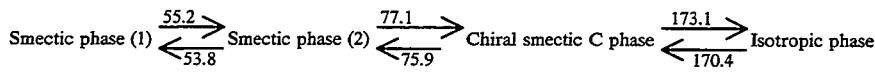

$Mn = 21,100$

Example 17

The polymeric liquid crystal copolymer compounds obtained in the above Examples, of polymeric liquid crystal compositions comprising any of these compounds and a low-molecular liquid crystal α2 or polymeric liquid crystal β2 were each applied to a glass plate provided with an ITO transparent electrode, on which a polyimide aligning film having been subjected to rubbing had been formed, by pressing, spin-coating or casting to form a film with a layer thickness of about 10 μm. Thereafter, annealing was carried out and then an upper electrode was attached. To the liquid crystal cell thus obtained, an electric field of 10 V/μm was applied in the state of an Sc* phase. At this time, molecules were observed reversing in response to the electric field. Response speeds were as shown in Table 2. The response speeds were determined by measuring polarization reverse currents.

Low-molecular liquid crystal α2

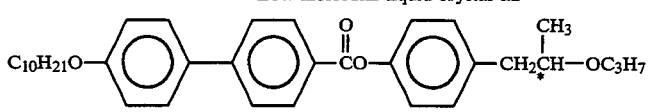

Polymeric liquid crystal β2

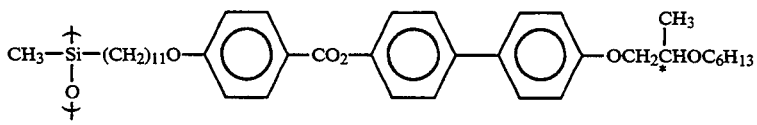

TABLE 2

| Composition (weight ratio) | Response speed (ms) |
|---|---|
| (9a) | 0.18 |
| (10a) | 0.42 |
| (11a) | 0.31 |
| (13a) | 0.11 |
| (14a) | 0.21 |
| (15a) | 0.85 |
| (16a) | 0.17 |
| (9a):α2 = 7.8:2.2 | 0.18 |
| (10a):α2 = 5.2:4.8 | 0.25 |
| (10a):α2 = 2.5:7.5 | 0.07 |
| (11a):β2 = 5.5:4.5 | 0.28 |
| (16a):β2 = 8.1:1.9 | 0.21 |
| (16a):β2 = 5.3:4.7 | 0.32 |

Comparative Example 2

Response speed of a 1:1 composition comprised of the above polymeric liquid crystal β2 and a polymeric liquid crystal γ2 shown below was measured in the same manner as in Example 8 to reveal that its response speed was 2.5 ms.

Polymeric liquid crystal γ1

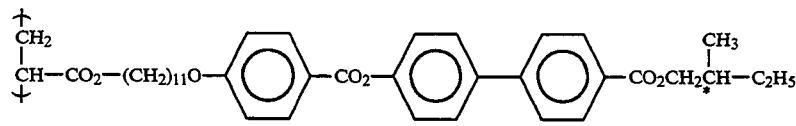

$Mn = 12,100$

As having been described above, it is possible according to the present invention to obtain a polymeric liquid crystal copolymer compound and polymeric liquid crystal composition that have low viscosity and good response characteristics, and can achieve large-area display.

Use of these polymeric liquid crystal copolymer compound and polymeric liquid crystal composition makes it also possible to obtain a polymeric liquid crystal device having good response characteristics and readily capable of achieving large-area display.

We claim:

1. A liquid crystal copolymer having a repeating unit (a) represented by the formula (Ia)

wherein A represents a polymeric main chain in which at least one C—C bond comprises the chain; and B represents a polyoxyalkylene group or $$-D\!\!-\!\!\left(\!\!\begin{array}{c}R\\|\\Si\!-\!O\\|\\R\end{array}\!\!\right)_{\!\!a}\!\!\begin{array}{c}R'\\|\\Si\!-\!R'\\|\\R'\end{array}$$

wherein D represents

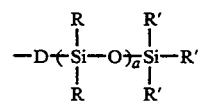

b and c each representing an integer of 0 to 20; R represents an alkyl group, a phenyl group, a siloxy group or a polysiloxy group; R' represents an alkyl group or a phenyl group; and a represents an integer of 0 to 50; and a representing unit (b) having a structure wherein a mesogen is bonded to a polymeric main chain in which at least one C—C bond comprises the chain through a spacer, said repeating unit (b) having a crystal-forming ability.

2. The polymeric liquid crystal copolymer compound according to claim 1, which has an optically active group.

3. The polymeric liquid crystal copolymer compound according to claim 1, which is ferroelectric.

4. The polymeric liquid crystal copolymer compound according to claim 1, wherein the repeating unit (b) has structure represented by the formula

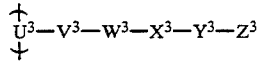
(A)

wherein $U^3$ represents a polymeric main chain in which at least one C—C bond comprises the chain, $V^3$ represents

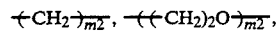

or a structure wherein at least one of hydrogen atoms of

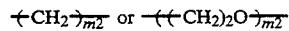

may be substituted with an alkyl group, a halogen atom, a cyano group, an amino group or a carbonyl group, wherein m2 represents an integer of 0 to 30; $W^3$ represents a single bond, —O—, —OCO—, —COO—, —CONR$^8$, —CO— or —NR$^8$, wherein R$^8$ represents a hydrogen atom or an alkyl group; $X^3$ represents a mesogen, which represents a structure wherein at least two rings selected from substituted or unsubstituted homoaromatic rings, heterocyclic rings and alicyclic rings are linked with a single bond, —O—, —OCO—, —COO—, $+CH_2\frac{1}{n}$, —N=N—, $+CH=CH\frac{1}{n}$, —CH=N—, —N—CH—, $+C=C\frac{1}{n}$, —CONR$^9$, $+CO\frac{1}{n}$ or —NR$^9$, wherein R$^9$ represents a hydrogen atom or an alkyl group and n represents an integer of 1 to 10, or may be structure wherein at least two of said rings combine to form a condensed ring; $Y^3$ represents a single bond, —O— or —COO—; $Z^3$ represents a substituted or unsubstituted alkyl group, a hydrogen atom, —CN, or a halogen atom.

5. The polymeric liquid crystal copolymer compound according to claim 4, wherein $U^3$ in the formula (A is one selected from the group consisting of the following:

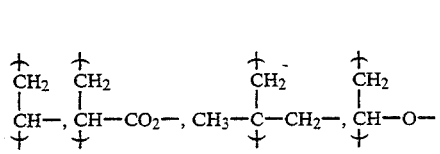

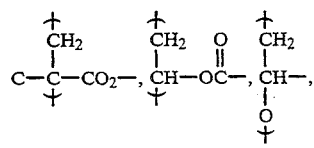

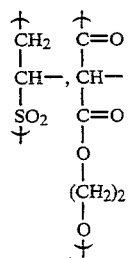

6. The polymeric liquid crystal copolymer compound according to claim 4, wherein the repeating unit (b) is a structure rendering a nematic liquid crystal.

7. The polymeric liquid crystal copolymer compound according to claim 4, wherein the repeating unit (b) is a structure rendering a cholesteric liquid crystal.

8. The polymeric liquid crystal copolymer compound according to claim 1, wherein the repeating unit (b) is a structure rendering a chiral smectic liquid crystal.

9. The polymeric liquid crystal copolymer compound according to claim 1, wherein the repeating unit (b) is one represented by the formula

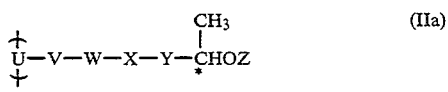
(IIa)

wherein U represents a polymeric main chain in which at least one C—C bond comprises the chain, V represents

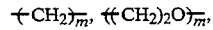

or a structure wherein at least one of hydrogen atoms of

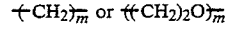

may be substituted with an alkyl group, a halogen atom, a cyano group, an amino group or a carbonyl group, wherein m represents an integer of 0 to 30; W represents a single bond, —O—, —OCO—, —COO—, —CONR$^3$, —CO— or —NR$^3$, wherein R$^3$ represents a hydrogen atom or an alkyl group; X represents a mesogen, which represents a structure wherein at least two rings selected from substituted or unsubstituted homoaromatic rings, heterocyclic rings and alicyclic rings are linked with a single bond, —O—, —OCO—, —COO—,

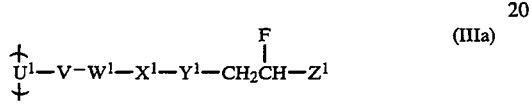

or —NR³, wherein R³ represents a hydrogen atom or an alkyl group and n represents an integer of 1 to 10, or may be structure wherein at least two of said rings combine to form a condensed ring; Y represents a single bond, —COOCH₂—, —O—CH₂—, or —OCO—; the asterisk * represents an asymmetric carbon atom, and Z represents —R² or —COR², wherein R² represents a hydrogen atom or a substituted or unsubstituted alkyl group.

10. The polymeric liquid crystal copolymer compound according to claim 1, wherein the repeating unit (a) is one represented by the formula $$\begin{array}{c} \phantom{} \\ U^1-V-W^1-X^1-Y^1-CH_2CH-Z^1 \\ \phantom{} \end{array} \quad (IIIa)$$

with F on the CH.

wherein $U^1$ represents a polymeric main chain in which at least one C—C bond comprises the chain, $V^1$ represents

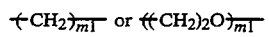

or a structure wherein at least one of the hydrogen atoms of

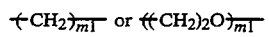

may be substituted with an alkyl group, an amino group or a carbonyl group, wherein m1 represents an integer of 0 to 30; $W^1$ represents a single bond, —O—, —OCO—, —COO—, —CONR³′, —CO— OR —NR³′, wherein R³′ represents a hydrogen atom or an alkyl group; $X^1$ represents a mesogen, which represents a structure wherein at least two rings selected from substituted or unsubstituted homo-aromatic rings, heterocyclic rings and alicyclic rings are linked with a single bond, —O—, —OCO—, —COO—,

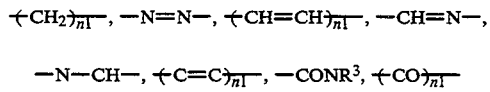

or —NR³′, wherein R³′ represents a hydrogen atom or an alkyl group and n1 represents a hydrogen atom or an alkyl group and n1 represents an integer of 1 to 10; $Y^1$ represents a single bond, —O— OR —COO—; $Z^1$ represents a substituted or unsubstituted alkyl group; and the asterisk * represents an asymmetric carbon atom.

11. The polymeric liquid crystal copolymer compound according to claim 1, wherein A in the formula (Ia) is one selected from the group consisting of the following:

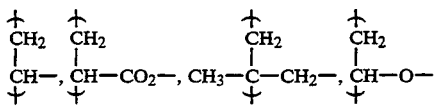

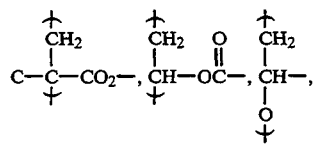

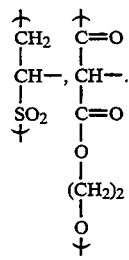

12. The polymeric liquid crystal copolymer compound according to claim 4, wherein B in the formula (Ia) a polyoxyalkylene group represented by the formula

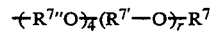

wherein R⁷″ and R⁷′ each represent a straight-chain or branched alkylene group having 1 to 10 carbon atoms; R⁷ represents an alkylene group having 1 to 10 carbon atoms; and q and r are each an integer of 0 to 10, provided that both are not 0 at the same time.

13. A polymeric liquid crystal composition comprising the polymeric liquid crystal copolymer compound according to any one of claims 1 to 12, and at least one of other polymeric compound, polymeric liquid crystal, low-molecular compound and low molecular liquid crystal.

14. A polymeric liquid crystal device comprising the polymeric liquid crystal copolymer compound according to any one of claims 1 to 12.

15. A polymeric liquid crystal device comprising the polymeric liquid crystal composition according to claim 13.

* * * * *

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below: On the title page: Item [54] and Column 1, line 3,

[54] Title

"COMPOSITION," should read --COMPOSITION--.

[73] Assignee:

"Cannon Kabushiki Kaisha" should read --Canon Kabushiki Kaisha--.

[30] Foreign Application Priority Data

Insert the following:
--June 12, 1991 [JP] Japan ....3-166093--.

COLUMN 2

Line 14, "put" should read --been put--; and

Line 68, "n" should read --D--.

COLUMN 3

Line 38, "provide" should read --provides--.

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

<u>COLUMN 10</u>

Lines 20-29, 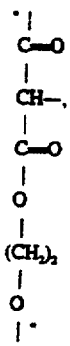 should read 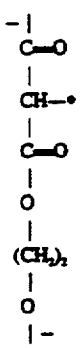

Line 64, " 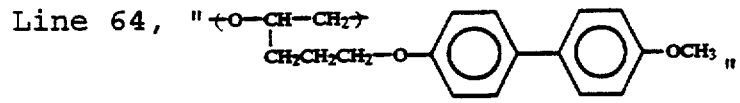 "

should be deleted.

<u>COLUMN 15</u>

Line 1, insert --Formula (IIIa).

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

$-CH=N-$, $-N=CH-$, $-(C{\equiv}C)_{n1}-$, $-CONR^{3'}$, $-(CO)_{n1}-$ or $-NR^{3'}$, wherein $R^{3'}$ represents a hydrogen atom or an alkyl group and--;

Line 13, "—CO—;" should read -- —COO—;--; and

Line 21, "hydrogen" should read --hydrogen,--.

COLUMN 20

Line 1, "hydrogen" should read --hydrogen,--.

COLUMN 21

Line 7, " 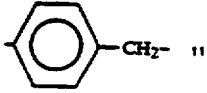 "  should read -- 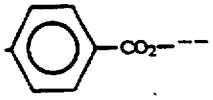 --

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

COLUMN 24

Line 23, "1°" should read --①--;

Line 28, "2°" should read --②--;

Line 34, "3°" should read --③--;

Line 40, "4°" should read --④--;

Line 46, "5°" should read --⑤--; and

Line 52, "6°" should read --⑥--.

COLUMN 25

Line 31, "Ii)" should read --ii)--.

COLUMN 26

Formula 10, " 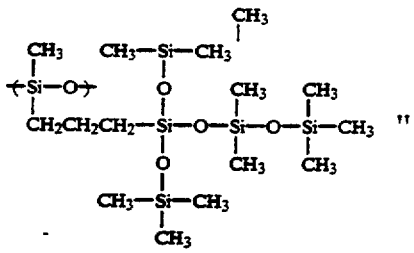 "

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

should read --

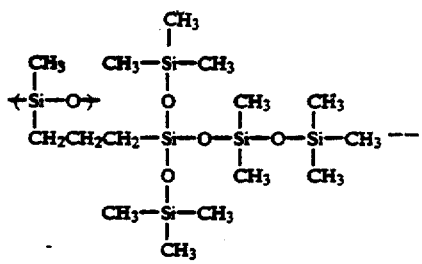

COLUMN 27

Line 62, "CONR$^9$," should read -- —CONR$^9$,--.

COLUMN 30

Line 11, "smecticic" should read --smectic--.

COLUMN 38

Line 14, "Z1" should read --Z$^1$--.

COLUMN 41

Line 34, "in" should be deleted.

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

COLUMN 42

Line 14, "hydrosililation" should read --hydrosilylation--.

COLUMN 53

Line 36, "followings;" should red --following,--.

COLUMN 54

Monomer (4), should read --

COLUMN 59

Line 47, insert --Mn=17,100--.

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

COLUMN 61

Line 65, "formula (A" should read --formula (A)--.

COLUMN 62

Lines 41-44, formula (IIa) "
$$\underset{+}{\overset{+}{U}}-V-W-X-Y-\overset{\overset{CH_3}{|}}{\underset{\bullet}{C}}HOZ \qquad (IIa)$$
"

should read --
$$\underset{+}{\overset{+}{U}}-V-W-X-Y-\overset{\overset{CH_3}{|}}{\underset{\bullet}{C}}HO-Z \qquad (IIa)$$
--

Line 66, "homoaromatic" should read --homo-aromatic--.

COLUMN 63

Line 9, "be" should read --be a--;

Lines 21-24, formula (IIIa) "
$$\underset{+}{\overset{+}{U^1}}-V-W^1-X^1-Y^1-CH_2\overset{\overset{F}{|}}{C}H-Z^1 \qquad (IIIa)$$
"

should read --
$$\underset{+}{\overset{+}{U^1}}-V^1-W^1-X^1-Y^1-CH_2\overset{\overset{F}{|}}{C}H-Z^1 \qquad (IIIa)$$
--

UNITED STATES PATENT AND TRADEMARK OFFICE
CERTIFICATE OF CORRECTION

PATENT NO. : 5,447,655

DATED : September 5, 1995

INVENTOR : KOICHI SATO, ET AL.

It is certified that errors appear in the above-identified patent and that said Letters Patent is hereby corrected as shown below:

<u>COLUMN 63, Cont'd.</u>

Line 41, "OR" should read --or--;

Line 55 and 56, "and nlrepresents a hydrogen atom or an alkyl group" should be deleted.

Line 57, "OR" should read --or--.

<u>COLUMN 64</u>

Line 35, "a" should read --is a--; and

Line 49, "of" should be deleted.

Signed and Sealed this

Twentieth Day of August, 1996

BRUCE LEHMAN

Attest:

Attesting Officer

Commissioner of Patents and Trademarks